United States Patent
Chatterjee et al.

(10) Patent No.: US 9,319,515 B2
(45) Date of Patent: *Apr. 19, 2016

(54) CALL NOTIFICATION WITH RICH CALLER IDENTIFICATION

(71) Applicant: Cisco Technology, Inc., San Jose, CA (US)

(72) Inventors: Saurav Chatterjee, Foster City, CA (US); Josh Perfetto, Saratoga, CA (US); Hemendra Rana, Campbell, CA (US); Paul Fullarton, Sunnyvale, CA (US); Ankur Shah, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,297

(22) Filed: Jan. 26, 2015

(65) Prior Publication Data

US 2015/0133096 A1    May 14, 2015

Related U.S. Application Data

(60) Continuation of application No. 13/911,738, filed on Jun. 6, 2013, now Pat. No. 8,942,368, which is a division of application No. 11/726,426, filed on Mar. 21, 2007, now Pat. No. 8,503,658, which is a (Continued)

(51) Int. Cl.
*H04M 3/42* (2006.01)
*H04L 12/66* (2006.01)
(Continued)

(52) U.S. Cl.
CPC ........ *H04M 3/42042* (2013.01); *H04M 3/4234* (2013.01); *H04M 3/42314* (2013.01);
(Continued)

(58) Field of Classification Search
CPC ............ H04M 7/0069; H04M 7/1235; H04M 2203/1091; H04M 2203/2044; H04M 2203/2072; H04M 2203/5009; H04M 2207/18; H04M 3/42008; H04M 3/42042; H04M 3/4234; H04M 3/42246; H04M 3/42314; H04M 3/42365; H04M 3/436; H04M 3/44; H04M 3/46; H04M 3/465; H04M 3/493; H04M 3/5233; H04M 3/56; H04W 4/16
USPC ........... 379/211.01, 211.02, 212.01; 370/352; 455/415

See application file for complete search history.

(56) References Cited

U.S. PATENT DOCUMENTS

| 4,942,602 A | * | 7/1990 | Baker, Jr. | ................ | H04M 3/51 |
| | | | | | 370/270 |
| 5,539,886 A | * | 7/1996 | Aldred | .................... | G06F 9/542 |
| | | | | | 379/202.01 |

(Continued)

*Primary Examiner* — Khai N Nguyen
(74) *Attorney, Agent, or Firm* — Patterson + Sheridan, LLP

(57) ABSTRACT

Communication systems and methods are described that include call notification with rich caller identification. Components of the communication systems are configured to receive a call for a user via an enterprise voice channel. A call request is automatically generated in response to event data of the received call. The call request includes caller data from enterprise databases or directories. The caller data provides identifying information of the caller to the user via the call request. The call request can include response options by which the user can participate in the call. The call request is routed to a target device of the user via a data channel of the host enterprise. The target device provides the user with multiple action or response options via the call request. The response options include for example accepting the call, delaying the call, forwarding the call, ignoring the call, and ignoring the caller.

19 Claims, 22 Drawing Sheets

Related U.S. Application Data continuation-in-part of application No. 10/890,922, filed on Jul. 14, 2004, now Pat. No. 8,041,020.

(60) Provisional application No. 60/784,747, filed on Mar. 21, 2006, provisional application No. 60/487,143, filed on Jul. 14, 2003.

(51) Int. Cl.

| | |
|---|---|
| *H04M 7/00* | (2006.01) |
| *H04M 7/12* | (2006.01) |
| *H04W 4/16* | (2009.01) |
| *H04M 3/436* | (2006.01) |
| *H04M 3/44* | (2006.01) |
| *H04M 3/46* | (2006.01) |
| *H04M 3/493* | (2006.01) |
| *H04M 3/523* | (2006.01) |
| *H04M 3/56* | (2006.01) |

(52) U.S. Cl.
CPC .......... *H04M 7/0069* (2013.01); *H04M 7/1235* (2013.01); *H04W 4/16* (2013.01); *H04M 3/42008* (2013.01); *H04M 3/42246* (2013.01); *H04M 3/42365* (2013.01); *H04M 3/436* (2013.01); *H04M 3/44* (2013.01); *H04M 3/46* (2013.01); *H04M 3/465* (2013.01); *H04M 3/493* (2013.01); *H04M 3/5233* (2013.01); *H04M 3/56* (2013.01); *H04M 2203/1091* (2013.01); *H04M 2203/2044* (2013.01); *H04M 2203/2072* (2013.01); *H04M 2203/5009* (2013.01); *H04M 2207/18* (2013.01)

(56) References Cited

U.S. PATENT DOCUMENTS

| | | | | |
|---|---|---|---|---|
| 5,570,420 | A * | 10/1996 | Bress | H04M 3/42 379/221.08 |
| 5,652,866 | A * | 7/1997 | Aldred | H04L 12/1813 375/222 |
| 5,696,809 | A * | 12/1997 | Voit | H04M 3/2254 379/22.01 |
| 5,719,942 | A * | 2/1998 | Aldred | H04L 12/5695 370/241 |
| 6,112,085 | A * | 8/2000 | Garner | H04B 7/18539 455/428 |
| H1921 | H * | 11/2000 | Fletcher | G06F 8/67 455/433 |
| 6,614,781 | B1 * | 9/2003 | Elliott | H04L 12/6418 370/352 |
| 6,961,334 | B1 * | 11/2005 | Kaczmarczyk | H04M 3/38 370/354 |
| 2003/0112944 | A1 * | 6/2003 | Brown | H04M 3/42 379/201.01 |
| 2004/0022237 | A1 * | 2/2004 | Elliott | H04L 12/6418 370/356 |

* cited by examiner

FIG.7/1

```
OLWP-Length: X
OLWP-Type: SIP/2.0

INVITE orative://saurav@mycompany.com SIP/2.0
From: tel:+16503232323
To: Saurav Chatterjee
<orative://saurav@mycompany.com>
Call-ID: 2xTb9vxSit55XU7p8@orative.com
CSeq: 1 INVITE
```
---(A)

```
OLWP-Length: X
OLWP-Type: SIP/2.0

UPDATE: orative://saurav@mycompany.com SIP/2.0
From: tel:+16503232323
To: Saurav Chatterjee <orative://saurav@mycompany.com>
Call-ID: 2xTb9vxSit55XU7p8@orative.com
CSeq: 2 UPDATE
Content-Type: text/roml
Content-Length: Y <rich_caller_id>
<sender_f_name>...</sender_f_name>
<sender_l_name>...</sender_l_name>
<sender_orative_address>...</sender_orative_address>
<priority>...</priority>
<description>Call from Joanne Smith. Weather in San Diego
is 58F</description>
</rich_caller_id>
```
---(B)

FIG.7/2
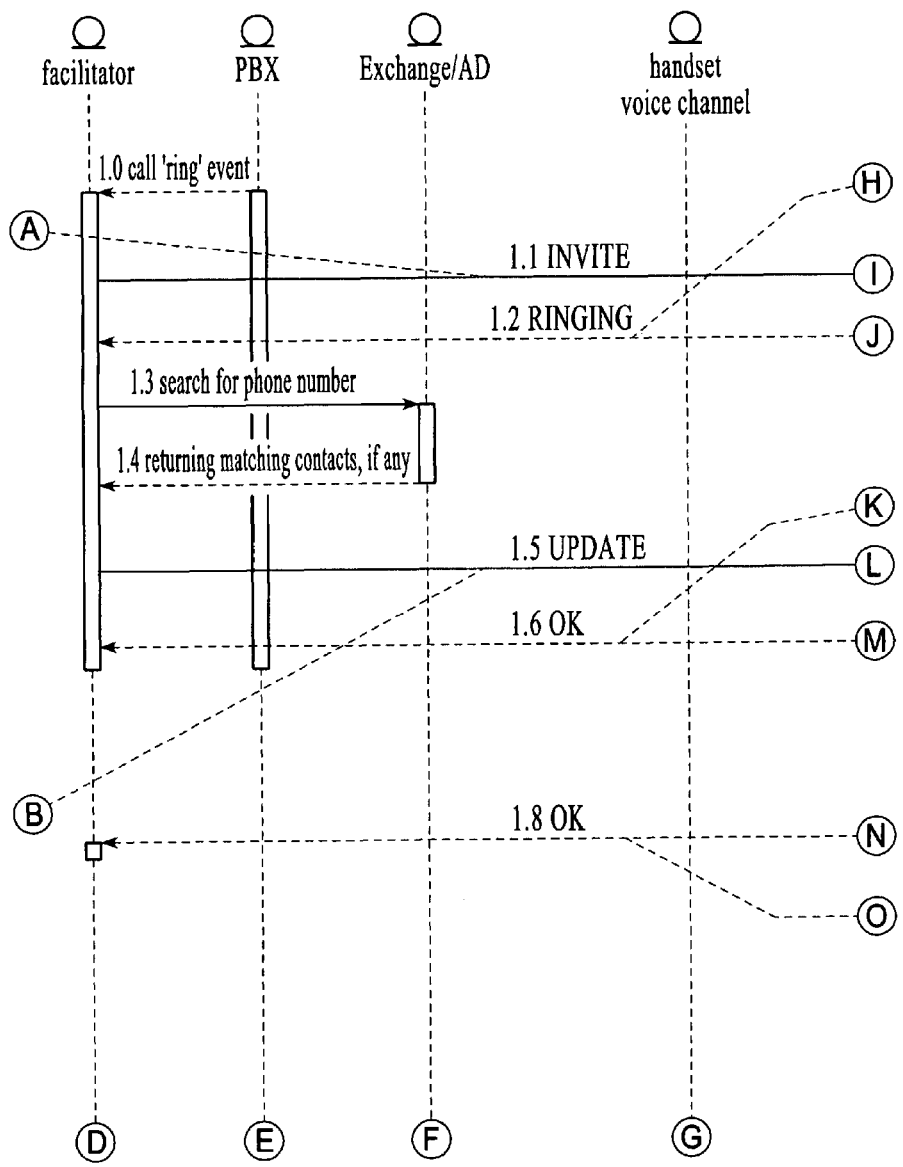

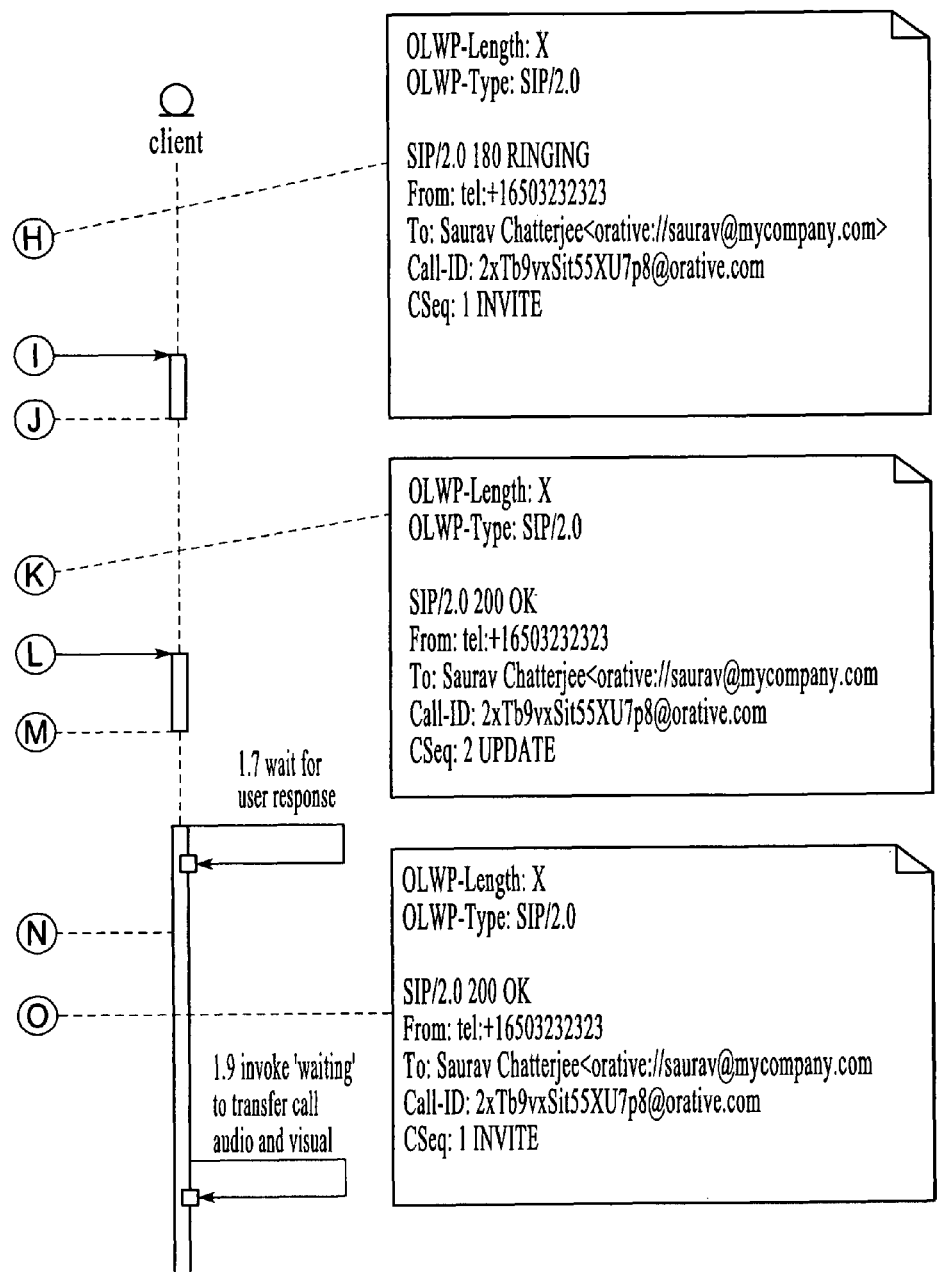
FIG.7/3

OLWP-Length: X
OLWP-Type: SIP/2.0

ACK orative://saurav@mycompany.com SIP/2.0
From: tel:165032332323
To: Saurav Chatterjee
<orative://saurav@mycompany.com>
Call-ID: 2xTb9vxSit55XU7p8@orative.com
CSeq: 4 ACK or OLWP-Length: X
OLWP-Type: SIP/2.0

BYE orative://saurav@mycompany.com SIP/2.0
From: tel:+16503232323
To: Saurav Chatterjee
<orative://saurav@mycompany.com>
Call-ID 2xTb9vxSit55XU7p8@orative.com
CSeq: 3 BYE

FIG.7/4

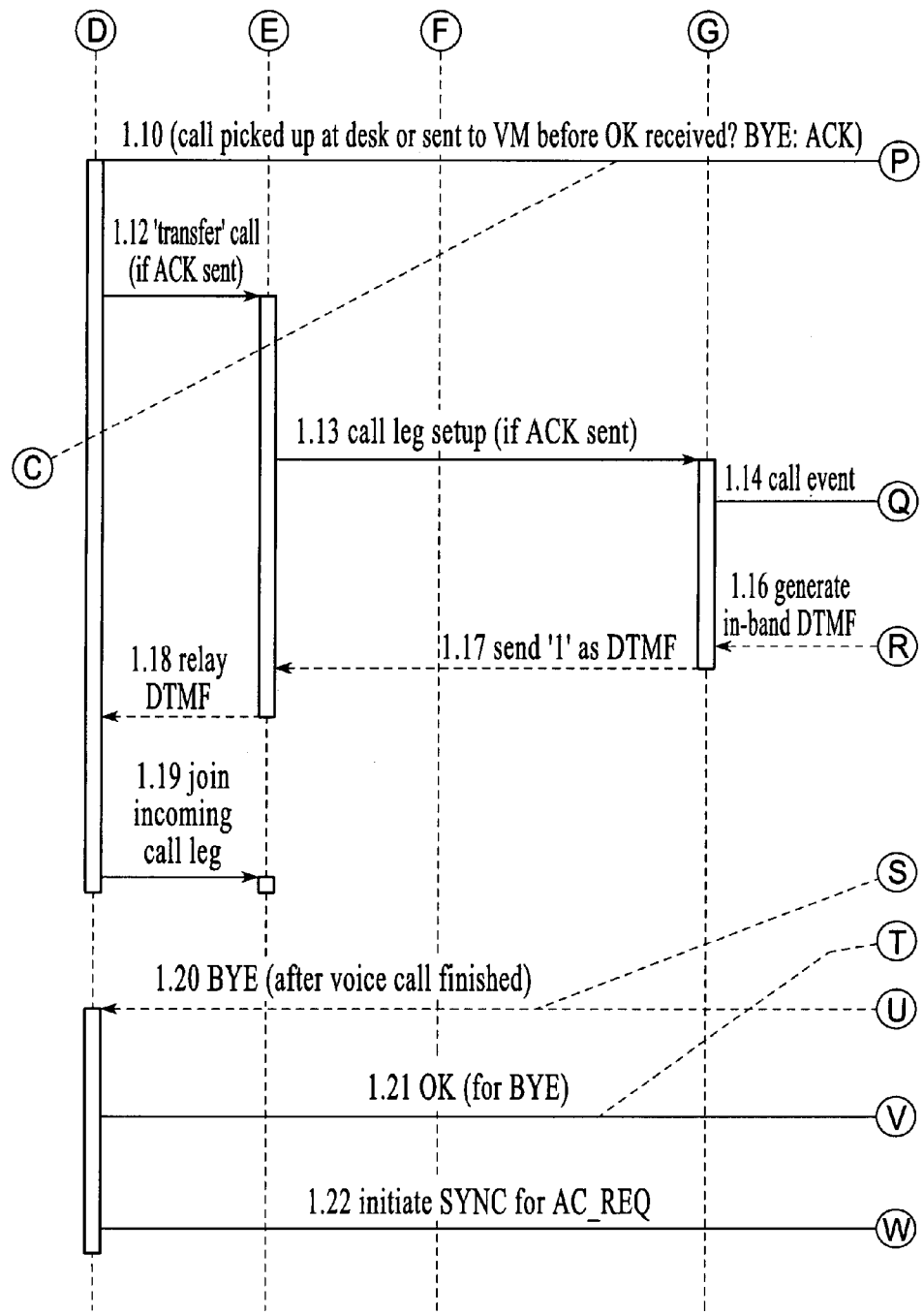
FIG.7/5

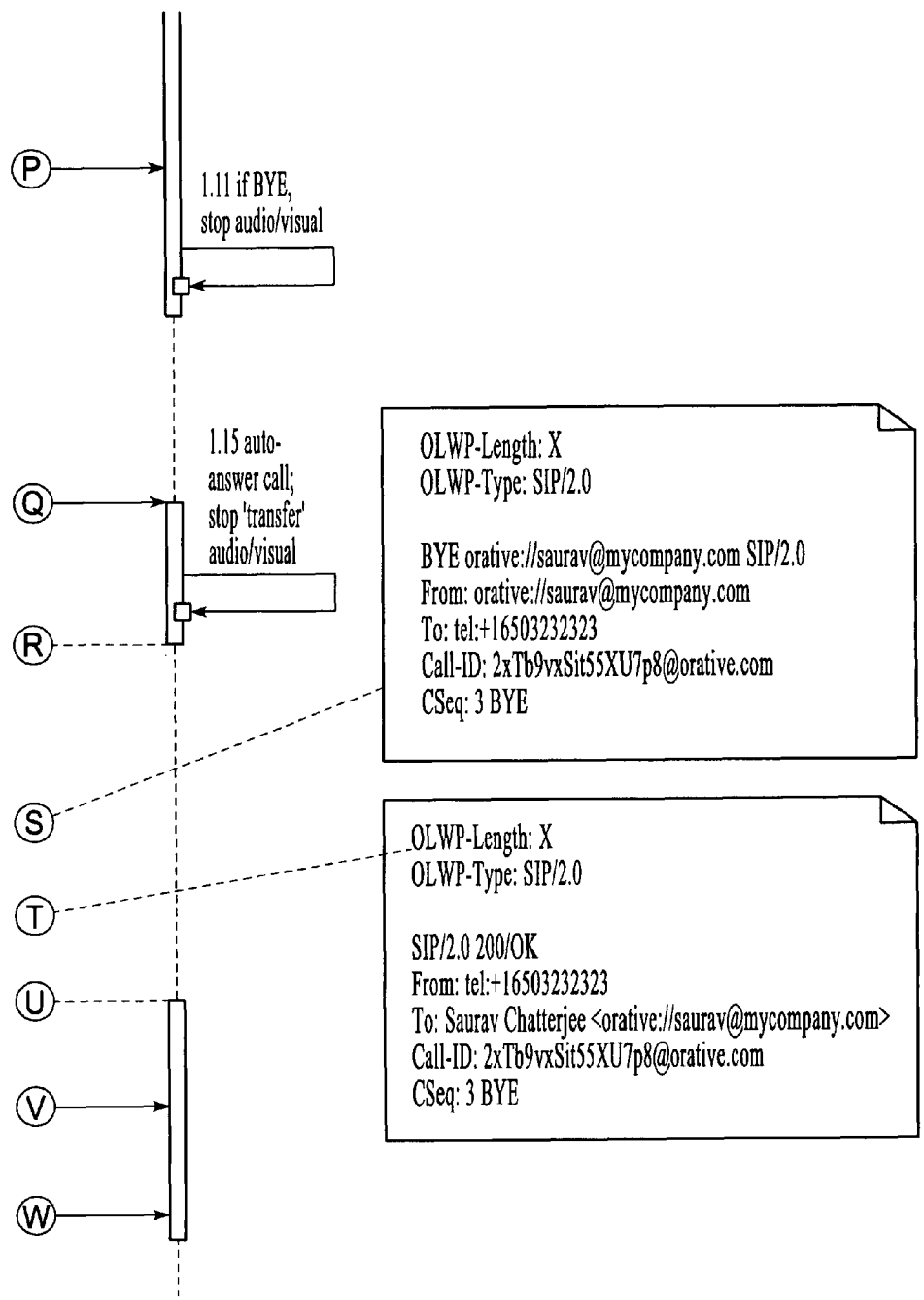
FIG.7/6

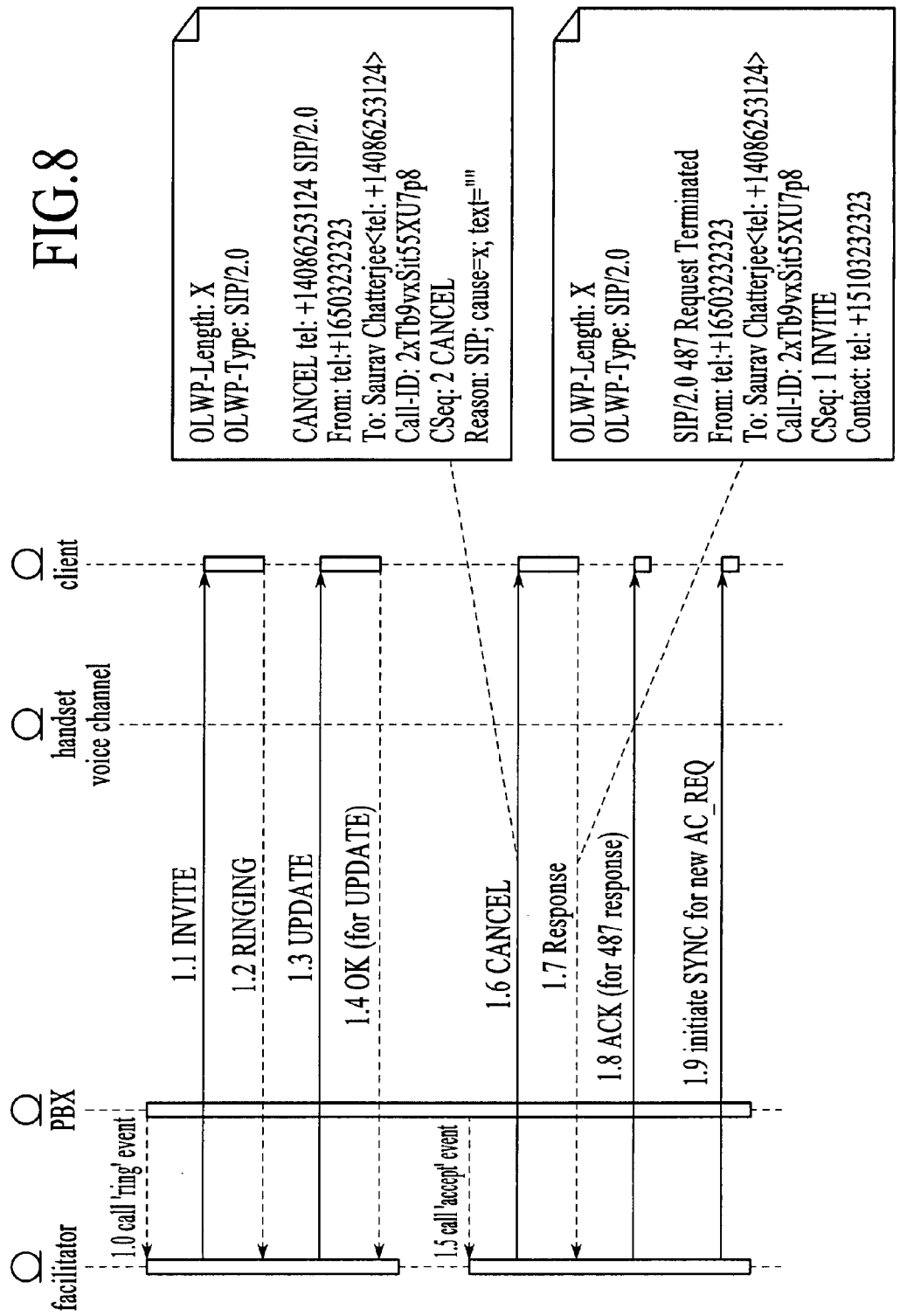

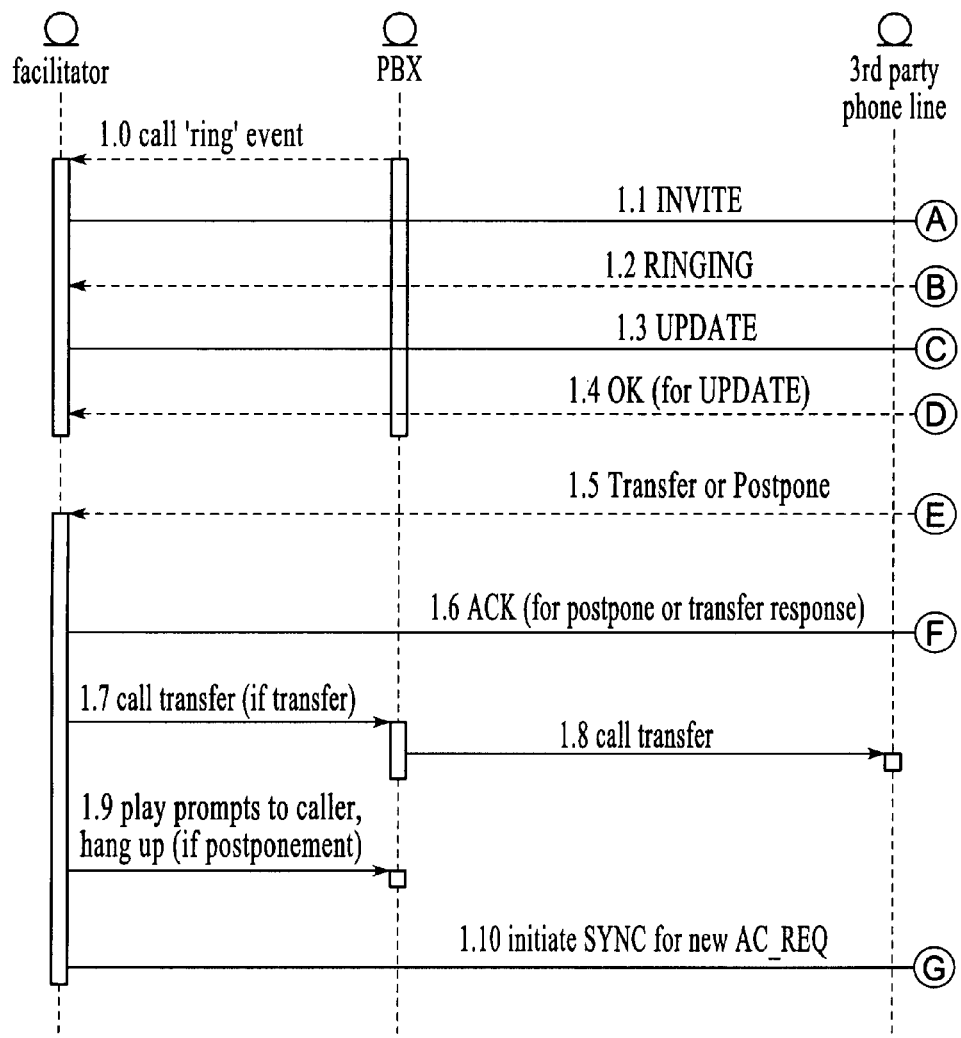
FIG.9/1

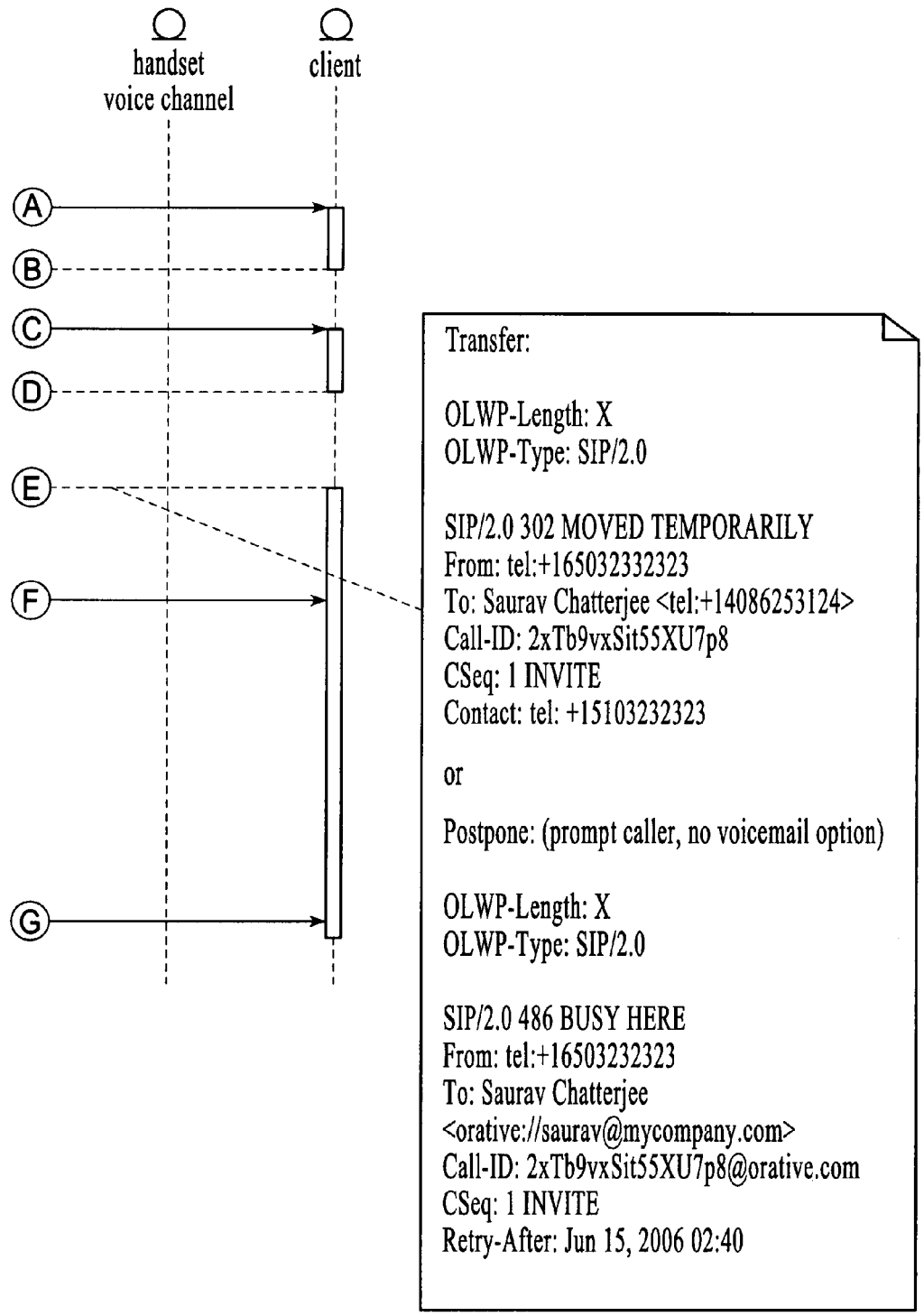
FIG.9/2

CALL NOTIFICATION WITH RICH CALLER IDENTIFICATION

CROSS REFERENCE TO RELATED APPLICATIONS

This application is a continuation of U.S. patent application Ser. No. 13/911,738 filed on Jun. 6, 2013, now U.S. Pat. No. 8,942,368, which is a divisional application of U.S. patent application Ser. No. 11/726,426, filed on Mar. 21, 2007, now U.S. Pat. No. 8,503,658, that claims the benefit of U.S. Provisional Application No. 60/784,747, filed on Mar. 21, 2006 and is a continuation-in-part of U.S. patent application Ser. No. 10/890,922, filed Jul. 14, 2004, now U.S. Pat. No. 8,041,020, that claims the benefit of U.S. Provisional Application No. 60/487,143, filed Jul. 14, 2003.

TECHNICAL FIELD

The disclosure herein relates generally to communication systems and, in particular, to wireless communication systems.

BACKGROUND

Mobile communications in today's real-time enterprise can be challenging. The problem is further complicated by changes in the workplace which have led to a more geographically dispersed and highly mobile workforce. In spite of the popularity of electronic mail (email), large numbers of people and employees still depend upon numerous other types of communications to collaborate with colleagues and drive business success. This is especially true for those in sales, service, operations and management roles who rely upon timely access to and coordination with colleagues as well as other employees, customers, partners and suppliers. Thus, communications remain an essential means of conducting business and staying in contact.

As a result of communications being so critical to business today, many professionals and enterprise employees now handle very large numbers of communications each business day. These communications can include disparate types of communications like emails, voicemails, instant messaging to name a few. Managing these large numbers and disparate types of communications consumes large amounts of time during the typical business day. For the growing number of people who spend a significant part of their day away from their offices or in meetings or other events, managing this large number of communications is highly time-consuming, frustrating and inefficient. Consequently, there is a need for communication systems that provide efficient, timely, and proactive real-time management of multiple types of communications.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

FIGS. 7/1-7/6 are a call flow for acceptance of a call at a client device, under an embodiment.

FIG. 8 is a call flow for acceptance of a call at an enterprise telephone, under an embodiment.

FIGS. 9/1-9/2 are a call flow for forwarding or delaying a call, under an embodiment.

DETAILED DESCRIPTION

Figure 1:
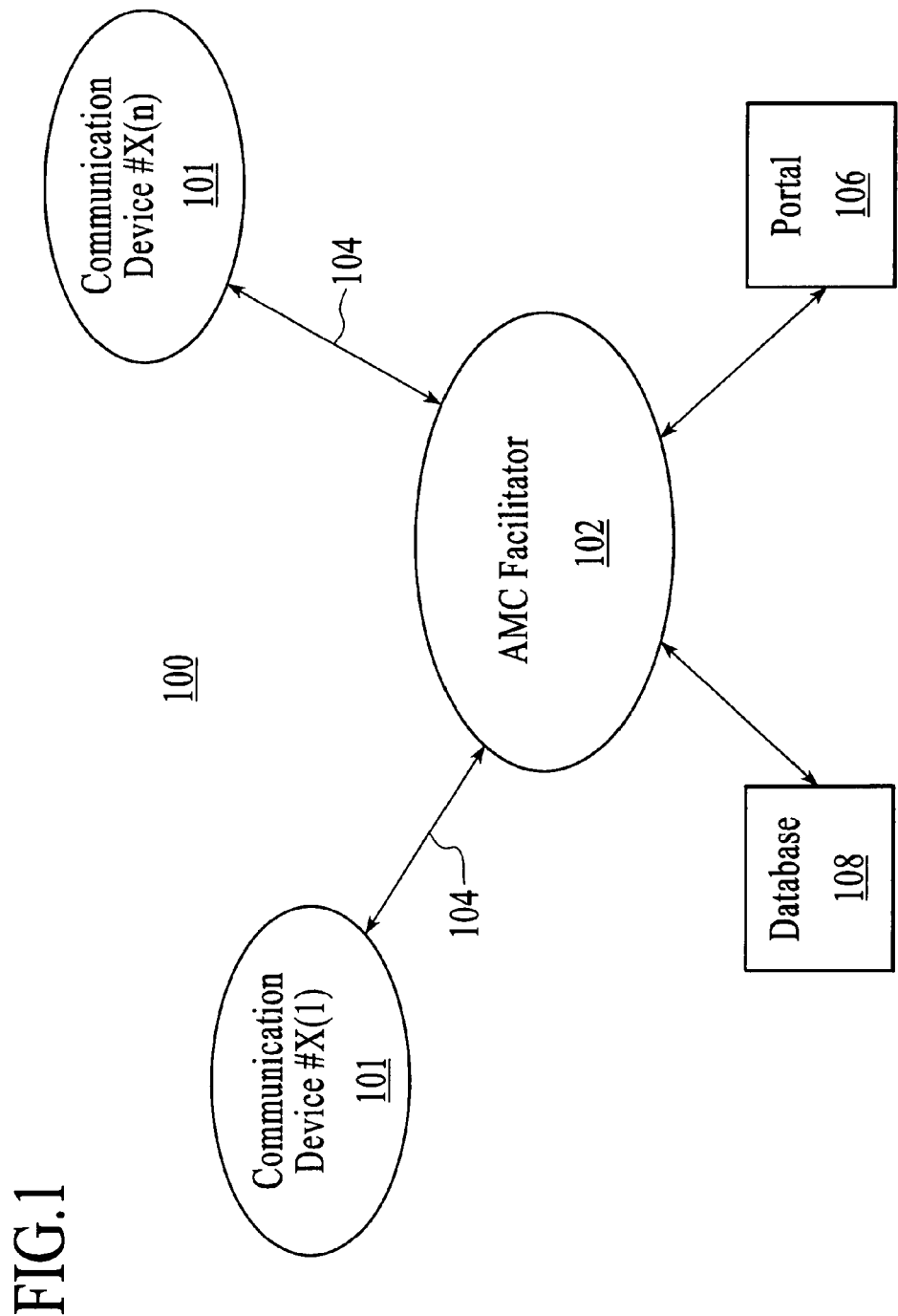
FIG. 1 is a block diagram of an active mobile collaboration (AMC) system, under an embodiment.

COMMUNICATION systems and methods are described that include call notification with rich caller identification (ID). Components of the communication systems and methods (collectively referred to herein as "communication systems") are configured to receive a call for a user via an enterprise voice channel. A call request is automatically generated in response to event data of the received call. The call request includes caller data from enterprise databases or directories. The caller data provides identifying information of the caller to the user via the call request. The call request can include response options by which the user can participate in the call. The call request is routed to an active client device of the user via a data channel. The voice channel and/or the data channel as described herein is hosted by an enterprise, a service provider, and/or a mobile network operator.

The call request is sent to the client device over a data channel so that an enterprise voice port is not required to "ring" or notify the target device. This reduces voice port usage within the enterprise because the use of the data channel means that every desk call does not require an additional voice port; instead, only the small fraction of calls that are accepted or forwarded dynamically from the target device require the use of an additional voice port.

The client device in response to the call request displays a notification message (e.g., pop-up message, appropriate ring tone, etc.) alerting the user of the call request and displaying the caller identifying information. The client device also provides the user with multiple action or response options via the call request. The response options include for example accepting the call, delaying the call, forwarding the call, ignoring the call, and ignoring the caller as described in detail below.

In the following description, numerous specific details are introduced to provide a thorough understanding of, and enabling description for, embodiments of the communications systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

The communication systems described herein use loosely-coupled client-server architectures to improve the efficiency of multiple types of communications. The communication systems, referred to herein as the active mobile collaboration (AMC) system, include a client application and a facilitator application. The client application, also referred to as the client or AMC client, is a component application of a variety of processor-based mobile communication devices and telephones.

The facilitator application of an embodiment, also referred to as the facilitator or AMC facilitator, is an application hosted on one or more servers or other processor-based devices. The facilitator communicates with a portable or mobile communications device via one or more couplings and the client hosted on the communications device. The facilitator communicates with the AMC client of a host portable device via a network coupling for example. The facilitator of alternative embodiments can be distributed among one or more portable processor-based devices including the same communication devices as the client application.

The components of the AMC system function to improve efficiency of communications by allowing communication device users to increase accessibility of enterprise and personal contact information from mobile phones and other personal digital assistants (PDAs), dynamically manage how and when mobile communications take place, intelligently screen messages, regardless of message type, based on identity of a messaging party, urgency, and subject matter, and determine which contacts in a directory are available to talk and which ones choose not to be disturbed, to name a few.

FIG. 1 is a block diagram of an active mobile collaboration (AMC) system 100, under an embodiment. The AMC system 100 includes any number X(n) of communication devices 101 coupled for communication via one or more facilitators 102 and one or more couplings 104. One or more of the communication devices 101 include an AMC client application. Likewise, the facilitator 102, also referred to herein as the AMC server 102, includes a facilitator application. The AMC client and facilitator function to allow users of the communication devices to dynamically manage how, when, and with whom mobile calls take place, intelligently screen calls based on caller identity, urgency, and subject matter, determine which contacts in a directory are available to talk and which ones choose not to be disturbed, and increase accessibility of enterprise and personal information (e.g., voicemail, contacts, calendars, etc.) from mobile phones. The AMC system 100 of an embodiment also includes couplings with one or more portals 106 and/or one or more databases 108, but is not so limited.

The communication devices 101 and facilitators 102 described herein are processor-based components running or hosting numerous applications or programs. As such, the communication devices 101 and facilitators 102 can include one or more processors (not shown) coupled among any number/combination of components (not shown) known in the art, for example buses, controllers, memory devices, and data input/output (I/O) devices, in any number of combinations The communication devices 101 described herein include processor-based electronic devices, for example, cellular telephones, personal computers, portable computing devices, portable telephones, portable communication devices, subscriber devices or units, PDAs, mobile devices, wireless devices, wireline devices, voice over Internet Protocol (VOIP) devices, private branch exchange (PBX) devices, soft clients, and desktop clients to name a few. The communication devices 101, also referred to as target devices, handsets, client devices, mobile devices, mobile communication devices, and portable communication devices, can include all such devices and equivalents, and are not limited to the communication devices described above.

As described above, the AMC clients are hosted on or run on communication devices 101 or handsets. The AMC client is an application that runs under control of processors on a variety of off-the-shelf mobile devices and telephones, for example, supporting open application environments such as the Symbian OS™, QUALCOMM's Binary Runtime Environment for Wireless (BREW™), as well as other application environments available from Palm, Microsoft, and Sun Microsystems, but is not so limited. Users or subscribers can download and deploy the AMC client over the air and/or over wired connections; further, the AMC client can be pre-loaded in the memory of the host device, or displayed as a thin client (e.g., browser or web client).

The couplings 104 include wired couplings, wireless couplings, and hybrid wired/wireless couplings, but are not so limited. Furthermore, the couplings 104 can include various networks and/or network components (not shown) of a communication service provider (also referred to herein as a carrier or mobile network operator), but are not so limited. The network and corresponding network components, when present in the couplings 104, can be any of a number of network types known in the art including, but not limited to, local area networks (LANs), metropolitan area networks (MANs), wide area networks (WANs), wireless LANS, cellular networks, proprietary networks, backend networks, and the Internet. The coupling may be via a number of protocols including but not limited to Hypertext Transport Protocol (HTTP), Transmission Control Protocol (TCP), User Datagram Protocol (UDP), Session Initiation Protocol (SIP), and Wireless Application Protocol (WAP). Furthermore, the coupling may be via a number of messaging standards including but not limited to Multimedia Messaging Service (MMS), Short Message Service (SMS), and Enhanced Messaging Service (EMS).

Figure 2:
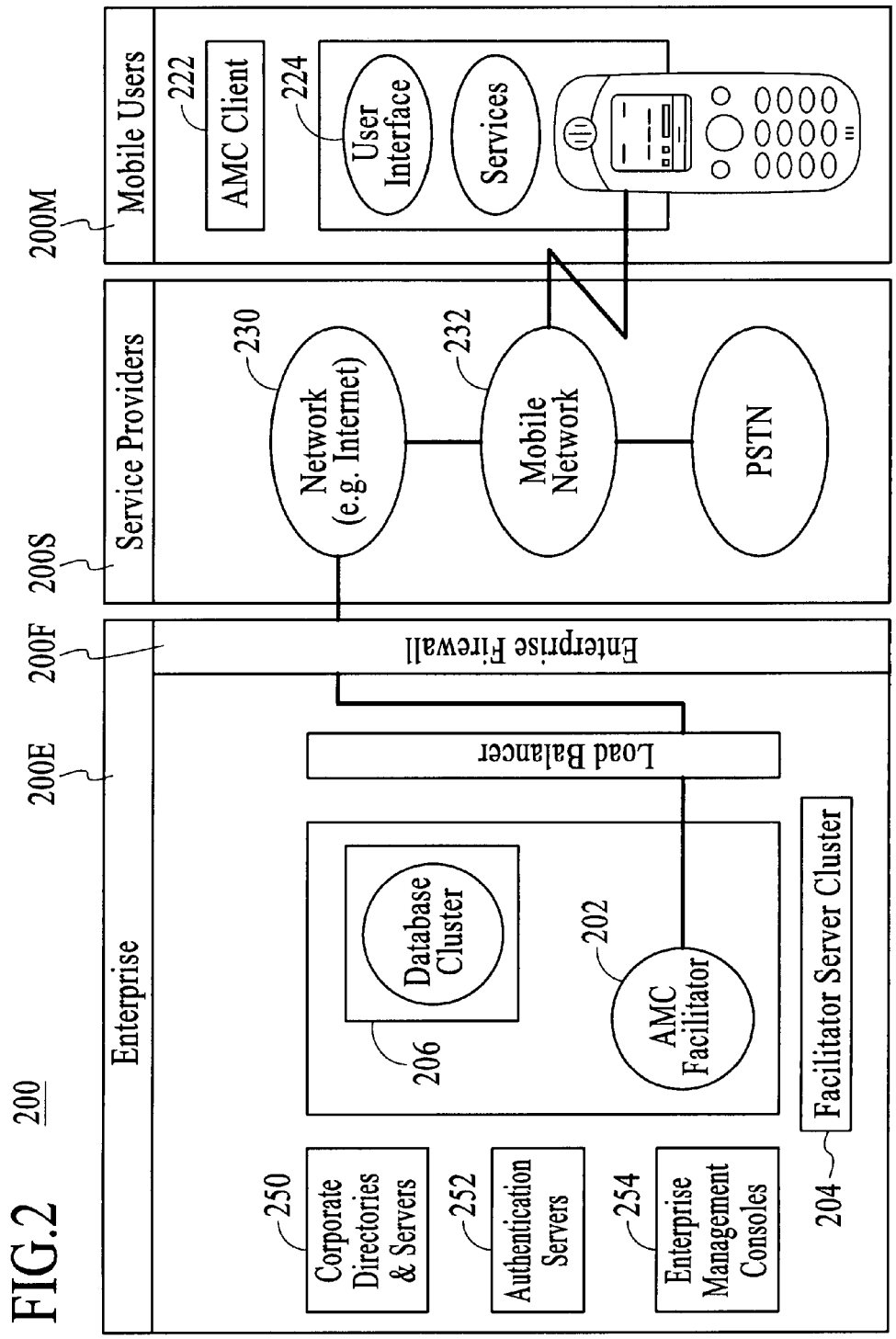
FIG. 2 is a block diagram of a communications system that includes an AMC system, under an alternative embodiment.

FIG. 2 is a block diagram of a communications system 200 that includes an AMC system, under an embodiment. The AMC system includes a facilitator 202 and a client 222 as described elsewhere herein. The facilitator 202 can be one or more facilitators that form a facilitator server cluster 204 and/or database cluster 206 within the enterprise 200E that are resident behind the enterprise firewall 200F, but the AMC system is not so limited. The host enterprise 200E also includes numerous other components, for example, corporate directories and servers 250, authentication servers 252, and enterprise management consoles 254 to name a few. The facilitator 202 is an integrated component of the host enterprise 200E and as such integrates with one or more components of the enterprise 200E. For example, couplings between the facilitator 202 and messaging and collaboration servers (e.g. Microsoft® Exchange) and/or corporate or other directories of the enterprise 200E allow easy, over-the-air download of personal and corporate contact information to devices, as well as searching of personal and corporate contact directories from the device. Other information of the enterprise 200E can also be delivered to the devices using the AMC system, information including but not limited to calendar information, calendar alerts, calendar reminders, etc.

The facilitator 202 couples to a client device or device of one or more users via one or more network couplings. The facilitator 202 couples to one or more devices using one or more service provider networks 200S, as an example. In this example configuration, the facilitator 202 couples to one or more service provider networks or infrastructures 200S via network couplings 230 (e.g. Internet), and then couples to devices 200M via the respective service provider networks 232. The AMC system protects data transfers between the facilitators 202 and the devices 200M using secure couplings, for example, protected with end-to-end security protocols like Secure Sockets Layer (SSL) or Transport Layer Security TLS cryptographic protocols.

The devices 200M of an embodiment include the AMC client 222. The AMC client 222, also referred to as the client 222, includes a graphical user interface 224 that integrates with the device applications and allows users to receive and scan enterprise information of the enterprise 200E. The enterprise information includes voicemail information (e.g., voicemail messages), contact information, directory information, calendar information, alerts that can include calendar reminders, conference notifications and call requests from colleagues, as described herein and in the Related Applications. Call requests include relevant details such as name, urgency, and subject matter to help users move business forward while screening out unwanted interruptions. The client 222 further provides a presence-aware phonebook that lets users find a contact and determine if the contact is available to talk, even before placing a call. The client 222 eliminates the need to manually enter contacts into the host device 200M. Instead, users download personal and/or corporate contact information over-the-air to their devices. The facilitator 202 and client 222 of the AMC system therefore provide automated, two-way synchronization to ensure contacts are backed up and up to date at the enterprise 200E.

An example of the AMC system of an embodiment is available as the Orative Enterprise Software from Orative Corporation of San Jose, Calif. The facilitator is available as the Orative Enterprise Server (e.g. runs on a standards-based, Java 2, Enterprise Edition (J2EE) platform that operates securely behind the enterprise firewall). The client is available as the Orative Client Software (e.g. runs on a variety of popular mobile devices, and leverages the latest application development environments including Symbian OS, Java and BREW to name a few).

Components of the AMC system generally include intra-domain and inter-domain routers. These routers serve to route messages between AMC clients and facilitators, between different facilitators, or a specific functional module within a facilitator. The routers operate in an incoming mode and an outgoing mode. In the incoming mode (caller is the client interface layer) the routers receive commands from AMC clients and route them to a functional module based on the message type. In the incoming mode therefore the router acts like a simple router; it examines the message type and routes it to the appropriate functional module of a facilitator.

In the outgoing mode (caller is a server functional module) the routers receive outgoing commands and route them to either an AMC device, to another facilitator within the domain, or to another domain. The router uses the target username/domain pair of the message to determine the target server where: if the target domain is the same as its facilitator's domain, the router looks up the home facilitator of the target in a (database) table and assigns this value as the destination facilitator; and if the target domain is different from its facilitator's domain, the router assigns the value "amc.<domain name>" as the name of the destination facilitator.

There is always a destination facilitator for a message, even if the session of the message's target user has expired. The message is always routed to the user's home facilitator. If the home facilitator has failed, the message is instead routed to the user's backup facilitator. The assumption is that foreign domains don't have a single point of failure and can always receive the message.

If the destination facilitator is the originating facilitator, this indicates the message needs to be routed to one or more destination clients. The set of active destination devices for this user is found in a database table map (key is username and active flag; value is a set of destination device unique identifiers). A device is uniquely identified by a device ID and DNS name/Internet Protocol (IP) address and port pair or phone number and carrier pair. The message is then placed in the user's queue and the rate controller per each active destination device is notified of the event.

In case of facilitator-to-facilitator routing, the message is placed in the facilitator's queue and the target facilitator's rate controller is signaled with the event. Facilitator-to-domain routing is identical to facilitator-to-facilitator routing.

Authentication ascertains the user identity for AMC client-facilitator and portal-facilitator communications and the server identity for facilitator-facilitator communication. User authentication of an embodiment is performed via an API of the facilitator, where the API supports many forms of authentication including basic username/password mechanisms to more complex challenge/response mechanisms, but the embodiment is not so limited.

While dynamically managing how and when mobile calls take place and intelligently screening calls based on numerous factors described above, the components of the AMC system also improve efficiency of voice communications by increasing accessibility of enterprise and personal contact information from mobile phones. Components of the AMC system of an embodiment support aggregation and management of contact information from various sources including, but not limited to, directories resident on desktop computers, corporate/enterprise directories, and contact information of the mobile device native phonebook, and provide data coupling between those sources and mobile devices hosting the AMC client, as described herein and in the Related Applications. This contact information is managed by providing the user with access via the mobile device to dynamically integrated contacts of a contact list and a number of phonebooks from multiple sources. The dynamic integration of multiple disparate directories provided by the AMC system of an embodiment allows a user to indicate the contacts he/she desires among all directories of a corresponding enterprise server, and then dynamically synchronizes all enterprise directories so as to place the desired information from the directories together into a common AMC phonebook. The integrated contact information available to the user is used in generating and routing call requests of the call notification described in detail below.

Figure 3:
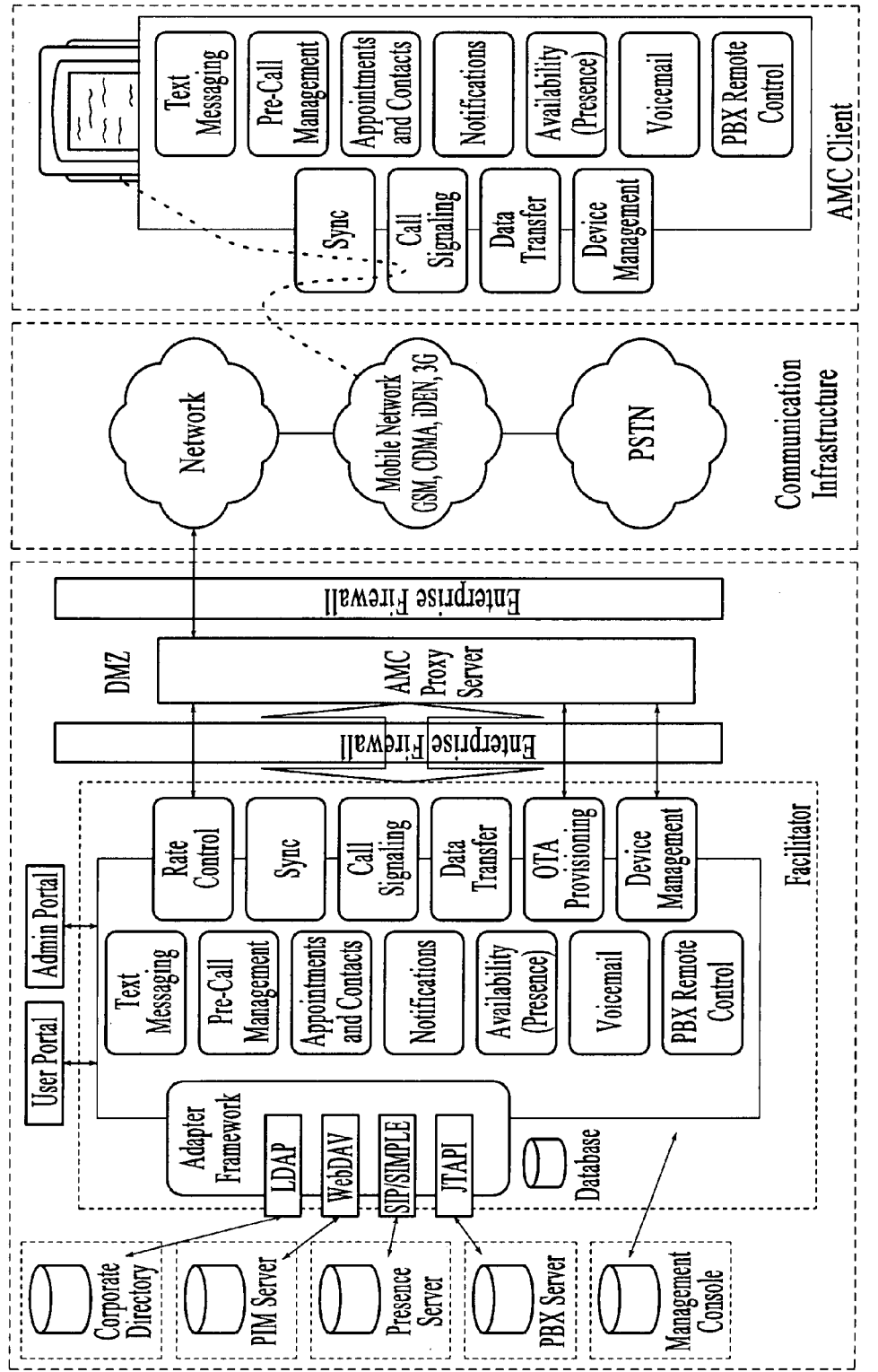
FIG. 3 is a block diagram of a communications system that includes an AMC system, under another alternative embodiment.

FIG. 3 is a block diagram of a communications system 300 that includes an AMC system, under an embodiment. The communications system 300 includes enterprise components, with which the AMC system is integrated, coupled to client devices via a communication or network infrastructure. The enterprise components include, but are not limited to, one or more of a corporate directory, Personal Information Manager (PIM) server, presence server, Private Branch Exchange (PBX) server, management console, and voicemail system (e.g., voicemail servers), to name a few.

The AMC system includes a facilitator as described herein. The facilitator includes an adapter or adapter framework by which the facilitator simultaneously integrates with components of the enterprise and enterprise servers. The facilitator uses an adapter for each enterprise component to which it integrates. The adapter of an embodiment is a protocol-specific adapter for each enterprise component to which it integrates; alternatively, the adapter includes vendor-specific adapters. The facilitator integrates with multiple components simultaneously. The AMC-adapters convert the data from the enterprise components (e.g. external) into a common data structure.

The facilitator includes one or more applications that support multiple functions provided by the AMC system. The AMC system functions include integrated access to enterprise voicemail as described here and, additionally, text messaging, pre-call management, appointments and contacts, notifications, availability (presence), voicemail, and PBX remote control as described herein and in the Related Applications.

The facilitator couples to a client device of one or more users via one or more network couplings or infrastructures. As an example, the facilitator couples to a mobile network using a coupling with another communications network (e.g. Internet). The mobile network or mobile infrastructure, which includes one or more service provider networks associated with respective ones of the client devices, provides a coupling to individual client devices.

Communications between the facilitator and the client device are controlled by the facilitator using one or more components and applications. The functions provided by the facilitator in controlling communications include one or more of rate control, synchronization (sync), call signaling, data transfer, over the air (OTA) provisioning, and device management to name a few. Optionally, the communications path between the facilitator and the communications network includes an AMC proxy server.

A protocol used between the client and the facilitator can be different from protocols used between other components of the AMC system and/or enterprise. More particularly, the protocol used between the client and the facilitator may not be the same as the protocol used between facilitator and PBX server. For example, the client to facilitator protocol may include session initiation protocol (SIP) or sync messages, while the facilitator to PBX protocol may include SIP, HTTP, or web services in which the facilitator acts as gateway.

The AMC system of an embodiment includes an Active Call Request (call request) that generally allows a caller to politely ask a receiver if the receiver can take or is ready to take a phone call, and provides discreet response options by which the receiver can provide timely feedback to the caller. Callers have the satisfaction of knowing the receiver acknowledged their call request and will make time to talk. When a call request is initiated in the AMC system, the facilitator for example monitors the call request. When the call request is delivered successfully, the facilitator sends the caller a delivery confirmation. If the user to whom the call request is addresses is not reachable (e.g., off the mobile network) the facilitator queues the request and, if applicable based on type and expiration, delivers it as soon as possible. The Active Call Request further provides discreet response options by which the recipient can provide timely feedback to the caller or originator of a communication relating to the call request.

Figure 4:
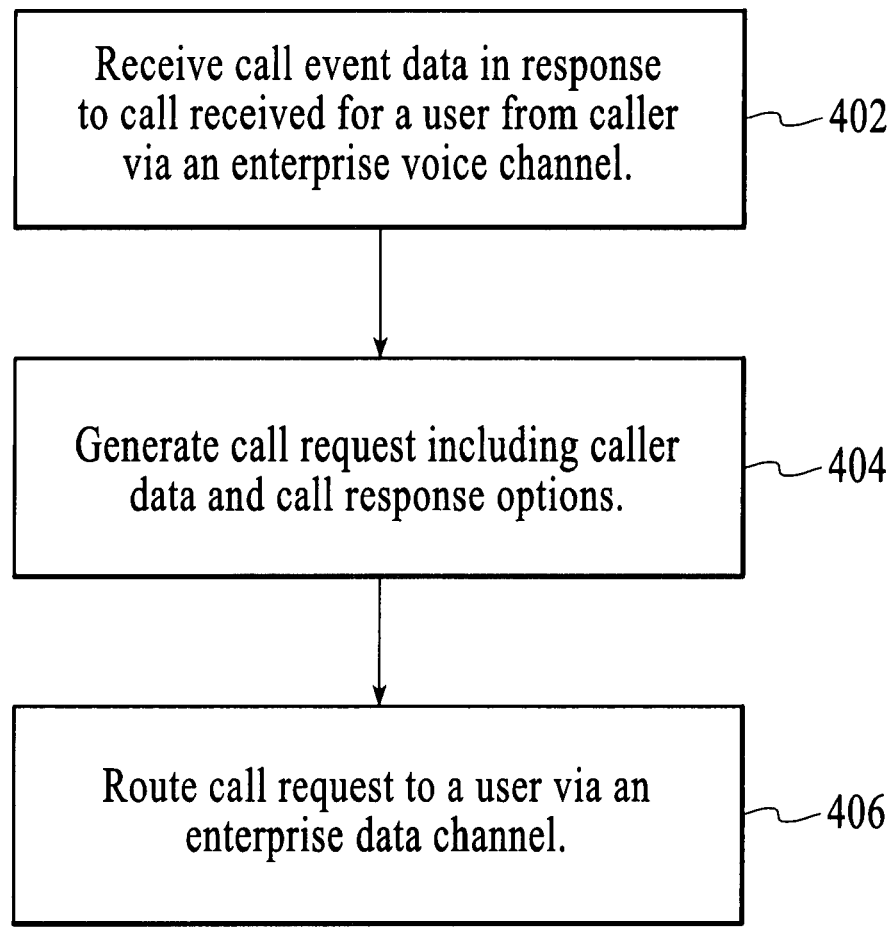
FIG. 4 is a flow diagram of call notification with rich caller ID, under an embodiment.

The AMC system of an embodiment uses the call request described above and in the Related Applications in providing call notification with rich caller ID. As an example, FIG. 4 is a flow diagram of call notification with rich caller ID 400, under an embodiment. Call event data is received 402 in response to a call received from a caller via a voice channel of an enterprise. The call is an attempt by the caller to reach an AMC user or subscriber. A call request is automatically generated 404 in response to event data of the received call. The call request includes caller data from enterprise databases or directories. The caller data provides identifying information of the caller to the user via the call request. The call request can include response options by which the user can participate in the call. The call request is routed 406 to a target device of the user via a data channel of the host enterprise. The target device provides the user with multiple action or response options via the call request. The response options include for example accepting the call, delaying the call, forwarding the call, ignoring the call, and ignoring the caller as described in detail below. Consequently, the call notification described herein overcomes limitations inherent in conventional enterprise telephone systems.

Conventional telephone systems (e.g., PBXs) include call forwarding and simultaneous ring features that enable users to know about their enterprise calls while they are away from their desk. Call forwarding enables a user to forward calls from his/her desk telephone to another telephone of their choice. The simultaneous ring feature rings two or more telephones in parallel, and the user may pick up any of these telephones to answer the call. These features are primarily used by mobile professionals to notify them via their cellular telephones of their desk calls while they are out of the office.

The conventional call forwarding and simultaneous ring features are limited however in providing complete communication solutions to mobile professionals. For example, a forwarded call or simultaneously ringing call can be answered by a person other than the user. Therefore, a call forwarded or simultaneously ringing a user's desk telephone and home telephone can be answered by another person (e.g., spouse, child, co-worker, visitor, roommate, friend, etc.), requiring the answering person to take a message or otherwise convey the call to the intended recipient As another example, a forwarded or simultaneously ringing call in conventional telephony can be answered by an external entity. A call forwarded to the user's home telephone or cellular telephone, or simultaneously ringing the desk and home or cellular telephones, may be answered first by either the home or cellular telephone's answering machine or voicemail service. This results in voicemails being stored in multiple different locations (e.g., enterprise voicemail, home voicemail, cellular telephone voicemail, etc.) making it difficult for the user to quickly and easily know about and/or retrieve voicemail at all possible locations.

As yet another example, caller ID at the conventional device receiving a call is based on the phonebook or contact information available to that target or receiving device. Therefore, if a call is forwarded or simultaneously rings a client device, the client device attempts to map the telephone number to a name based on the phonebook of the client device. Due to memory and other restrictions, the phonebook of a mobile or remote device is generally relatively smaller than the telephone number directories available within an enterprise (e.g., corporate directories, directory servers, electronic mail servers, customer relationship management (CRM) systems, human resource systems, financial systems, personal Exchange/Outlook contacts, etc.). Therefore, the chance of missing caller ID information is significant in conventional systems.

Additionally, simultaneous ring requires the use of two or more voice ports (depending on the number of lines to ring simultaneously). As the number of voice ports used reaches the maximum capacity for a host enterprise, other calls may be blocked, and may require costly upgrades to the enterprise to support additional voice ports.

Figure 5:
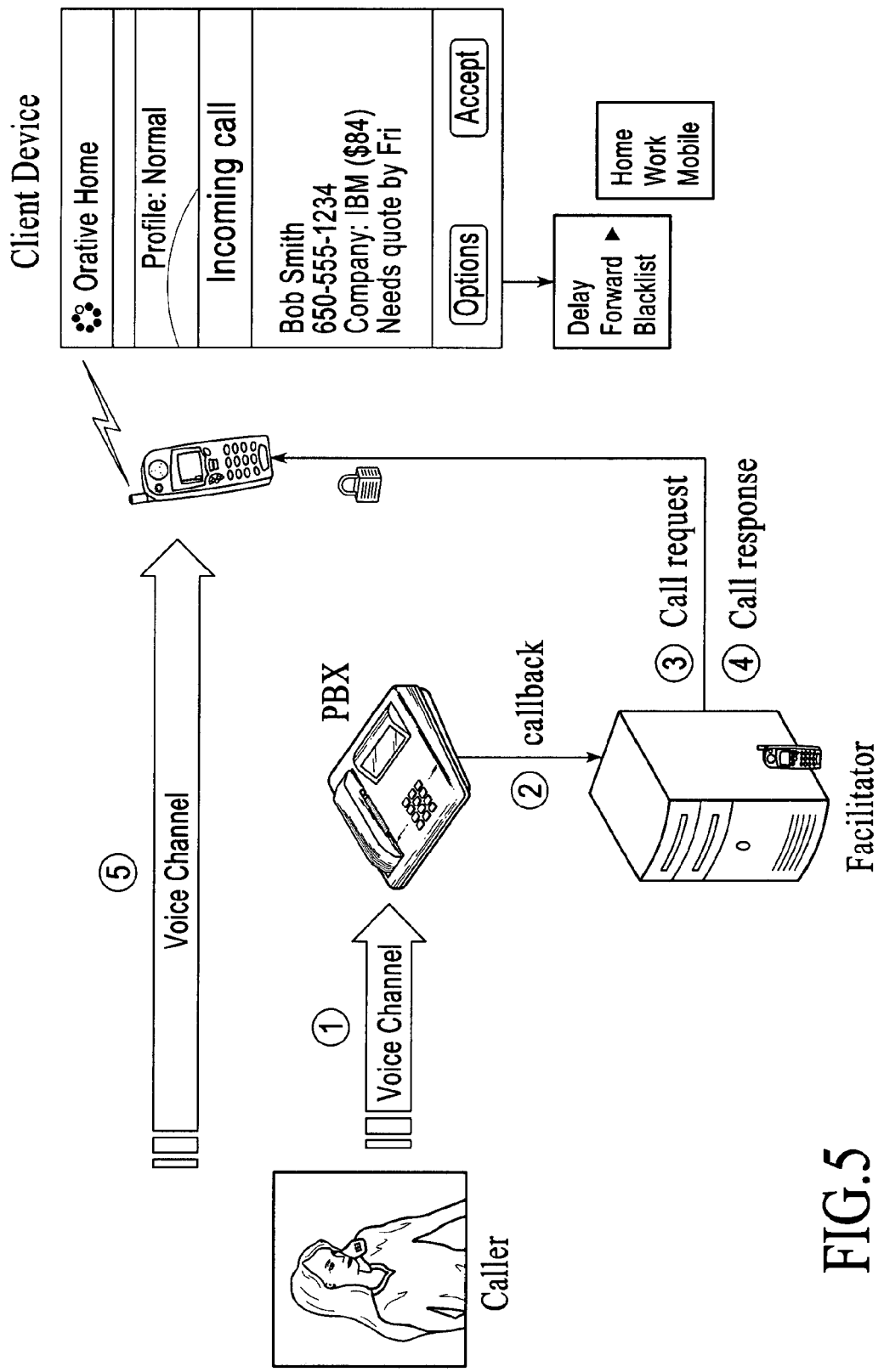
FIG. 5 is a flow diagram for call notification of the AMC system, under an embodiment.

The AMC system of an embodiment provides call notification to overcome deficiencies with call forwarding and simultaneous ringing. FIG. 5 is a flow diagram for call notification 500 of the AMC system, under an embodiment. Under call notification, the AMC user logs into the AMC system using his/her active client device. The facilitator then registers with the enterprise telephone system, the enterprise PBX for example, requesting the facilitator to send call events for the user's enterprise telephone line to the user's client device.

In call notification operations of an embodiment, when a caller places a call to the user's desk telephone, the PBX rings 1 the user's desk telephone and simultaneously sends a call event 2 to the facilitator. The desk telephone of the user can be, for example, a telephone coupled to an enterprise telephone system, or a telephone coupled to a central exchange (centrex) that provides telephone services to the enterprise. The facilitator transforms the call event information into an AMC call request by constructing a rich caller ID as described herein. The facilitator transfers or sends 3 the call request including the rich caller ID to the user's active client device. The AMC client hosted on the client device receives the call request and in response controls display of information of the call request (e.g., pop-up message, ring tone, etc.) alerting the user of the call request and displays the rich caller ID information. The call request includes information of numerous and varied response options available to the user for dealing with the incoming call. The response options of an embodiment can be presented and/or selected via numerous interfaces (e.g., cursor selection, drop-down menu, pop-up windows, text input, audio input, etc.). When for example the user selects the option of accepting or taking the call at his/her client device, the facilitator controls or instructs the PBX receiving the call to extend or transfer 5 the call to the user's client device. Upon completion of the call between the AMC user and the caller, the client and server synchronize call logs, blacklists and other state information.

The facilitator transfers or sends the call request to the client device over a data channel so that an enterprise voice port is not required to ring the mobile telephone. This reduces voice port usage within the enterprise because the use of the data channel means that every incoming desk call does not require an additional voice port; instead, only a small fraction of calls that are accepted or re-directed dynamically to a number external to the enterprise from the client device require the use of an additional voice port.

Because the call notification of an embodiment does not actually utilize the cellular voice channel of the client device initially, the call notification reduces or eliminates the chances of an accidental transfer of the call to the carrier's voicemail. Unlike static forwarding rules, the user can dynamically forward calls as appropriate, so there is less chance of someone else picking up the call.

Figure 6:
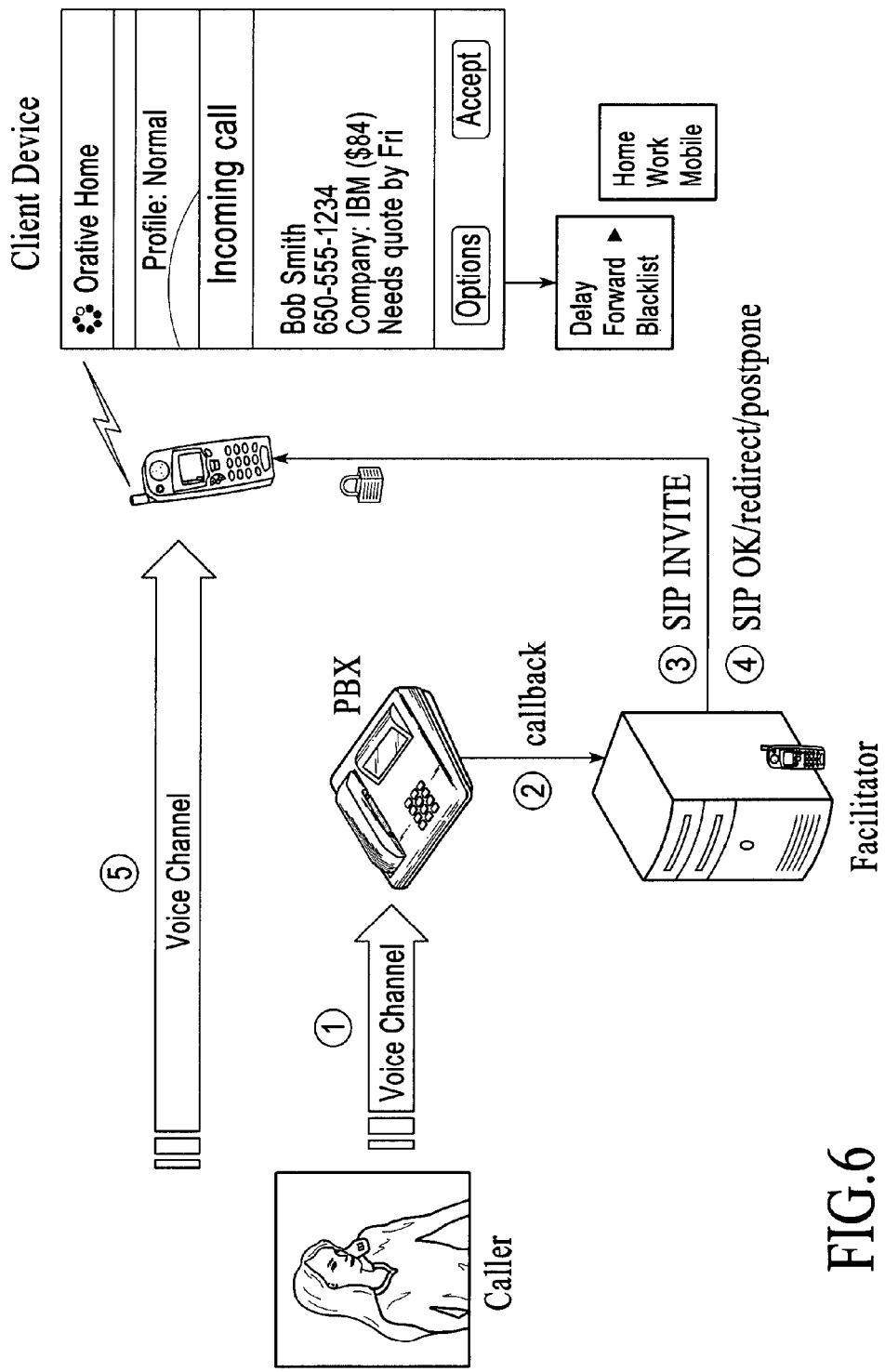
FIG. 6 is a flow diagram for call notification of the AMC system, under an alternative embodiment.

Call requests and responses can be exchanged between the facilitator and the client device using a number of protocols, including data synchronization and session initiation protocol (SIP); different types of call requests may be exchanged using different protocols. FIG. 5 is a flow diagram for call notification 500 of the AMC system, using the synchronization embodiment for call requests and responses. FIG. 6 is a flow diagram for call notification 600 of the AMC system, using the SIP embodiment for call requests and responses, under an embodiment. The facilitator provides call notifications including the SIP message as described above with reference to FIG. 5. Furthermore, the AMC user can respond to the SIP message as described above with reference to FIG. 5.

The AMC system of an embodiment provides the user with multiple action or response options at the client device. The action options include but are not limited to accepting the call, re-directing the call to another phone number, delaying or postponing the call, ignoring the call, and blacklisting the caller. Each of the action options are described below.

When receiving at his/her client device a call request corresponding to an incoming call, a user can "accept" the call, which indicates that the user wants the call extended or transferred to the client device. Generally, when the user selects via the client device this response option, the facilitator instructs or controls the PBX to extend or transfer the call as described above. Although the signaling was done over the data channel, the media for the call can be extended over either a cellular voice channel or a IP-based data channel (e.g., RTP stream), based on the device capabilities, current network access, and/or QoS needs.

When the user accepts the call, the call is transferred to the active client device. The user then participates in the transferred call using the active client device. FIGS. 7/1-7/6 are a call flow 700 for acceptance of a call at a client device under the SIP protocol, under an embodiment. This call flow 700 is presented as an example call flow 700 and does not limit the call acceptance described herein to only this call flow 700. In response to receipt of a call, the PBX sends a call event (e.g., 1.0 call "ring" event) to the facilitator. The facilitator generates and sends an invitation message to the client (e.g., 1.1 INVITE) hosted on the client device, and a response (e.g., 1.2 RINGING) is returned to the facilitator from the client. The client device plays an audio ringtone on the device, to simulate the ring of an incoming call. In parallel, the facilitator searches enterprise directories using the telephone number of the caller (e.g., 1.3 search for phone number) and, if the caller is found in the directories, the directories return detailed information of a matching contact (e.g., 1.4 returning matching contacts, if any). The facilitator sends a call notification to the client (e.g., 1.5 UPDATE) with the rich caller ID and response options, and a response (e.g., 1.6 OK) is returned to the facilitator from the client. The UPDATE is an optimization and this information can be included in the original INVITE message. The client waits for a user response at the client device (e.g., 1.7 wait for user response). In response to a user selection of a response option, the client sends a message (e.g., 1.8 OK) to the facilitator with information of the user selection. The client then waits for the call to be extended to the device phone number, and, while waiting for this incoming call, displays a call notification prompt at the client device (e.g., 1.9 invoke "waiting to transfer call" audio and visual).

If the incoming call is answered at the enterprise desk telephone belonging to the user or sent to enterprise voicemail prior to receipt at the facilitator of a user-selected 'acceptance' response option (e.g., 1.8 OK), the facilitator notifies the client of this condition (e.g., 1.10). The client in turn discontinues the audio and visual indicators of the call notification at the client device (e.g., 1.11 stop audio/visual), and synchronizes call logs (e.g., 1.22 initiate SYNC for AC_REQ), which indicates that the call was picked up at the desk phone or diverted to the corporate voicemail system.

If the acceptance response is received by the facilitator prior to the incoming call being answered at the enterprise desk telephone belonging to the user or sent to enterprise voicemail, the facilitator instructs the PBX to extend or transfer the call to the client device phone number (e.g., 1.12 "transfer" call (if ACK sent)). The PBX sets up a call leg with the client device via a voice channel (e.g., 1.13 call leg setup (if ACK sent)) (e.g., cellular voice channel), but not so limited. When the call is extended to the client device, the device platform API generates a call event (e.g., 1.14 call event) that is received by the client application. In response to this call event, the client automatically answers the call and stops the appropriate audio/visual transfer indication (e.g., 1.15 auto-answer call; stop "transfer" audio/visual).

To convey to the facilitator that the call was indeed answered by the mobile device, and not sent to the corresponding mobile network operator voicemail, the client device generates and sends a dual-tone multi-frequency (DTMF) signal to the PBX (e.g., 1.16 generate in-band DTMF). The client device sends a DTMF signal to the PBX (e.g., 1.17 send "1" as DTMF) and the PBX in turn relays the DTMF to the facilitator (e.g., 1.18 relay DTMF). The facilitator instructs the PBX to connect the call legs (e.g., 1.19 join incoming call leg) upon receipt of the DTMF.

Upon completion of the transferred voice call, the client device sends a message to the facilitator (e.g., 1.20 BYE (after voice call finished)), and the facilitator acknowledges (e.g., 1.21 OK (for BYE)). The facilitator then initiates synchronization of call logs and other state information (e.g., 1.22 initiate SYNC for AC_REQ).

If the facilitator does not receive the DTMF signal within a specific time, it instructs the PBX to drop the call leg to the mobile line and to send the original call to the corporate voicemail system.

In an alternative embodiment, the facilitator can instruct the PBX to extend the call to the mobile line immediately after the response (e.g., 1.6 OK) is returned to the facilitator from the client. In this embodiment, the facilitator can instruct the PBX to drop this call leg extension if the user does not affirmatively respond under with selection of a response option (e.g., 1.8 OK) or if the call is picked up at the desk phone or sent to corporate voicemail.

When receiving at his/her client device a call request corresponding to an incoming call, a user located at his/her desk can alternatively answer the incoming call at his/her enterprise telephone instead of responding to the call request on the client device. FIG. 8 is a call flow 800 for acceptance of a call at an enterprise telephone, under an embodiment. This call flow 800 is presented as an example call flow 800 and does not limit the call notification described herein to only this call flow 800. In response to receipt of a call, the PBX sends a call event (e.g., 1.0 call "ring" event) to the facilitator. The facilitator generates and sends an invitation message to the client (e.g., 1.1 INVITE) hosted on the client device, and a response (e.g., 1.2 RINGING) is returned to the facilitator from the client. The facilitator sends a call notification to the client (e.g., 1.3 UPDATE) with the rich caller ID and response options, and a response (e.g., 1.4 OK (for UPDATE)) is returned to the facilitator from the client.

In response to the user taking the incoming call at his/her enterprise telephone, the PBX sends an event message to the facilitator indicating acceptance of the call at the enterprise telephone (e.g., 1.5 call "accept" event). The facilitator notifies the client by canceling the call notification (e.g., 1.6 CANCEL), and a response (e.g., 1.7 Response) is returned to the facilitator from the client. The facilitator sends an acknowledgement message to the client device (e.g., 1.8 for 487 response). The facilitator then initiates synchronization of call logs and other state information (e.g., 1.9 initiate SYNC for AC_REQ).

When the user selects at the client device the option to re-direct or forward the call, the AMC system of an embodiment enables the user to select dynamic forwarding of the call to a device corresponding to another telephone number. The selection of dynamic re-directing by the user can include use of a forwarding number selected from a list of pre-defined user-specified forwarding numbers (e.g., hotel number, home number, another mobile phone number, etc.). Additionally, the dynamic forwarding includes the use of any number entered by the user, for example, via the client device. The facilitator, in response to receiving a selected or inputted number from the client, re-directs the call to the device corresponding to the selected forwarding telephone number.

When the user selects at the client device the option to delay the call, the caller is verbally notified by the facilitator that the user is busy and that the user will call back at a later time; the later time for call back can be specified by the facilitator. The caller may or may not be permitted to leave a voicemail message, depending on the user's settings. When a callback time is specified by the facilitator, the facilitator forwards a postponement reminder to the user at the appropriate time; the postponement reminder reminds the user to call back the original caller. When allowing the user to select times for participating in a delayed call, as an additional feature, the facilitator may only show future times for which both parties are free, if possible, based on the (shared) calendars in the AMC system.

FIGS. 9/1-9/2 are a call flow 900 for re-directing and postponing a call, under an embodiment. This call flow 900 is presented as an example call flow 900 and does not limit the call transfer or delay described herein to only this call flow 900. In response to receipt of a call, the PBX sends a call event (e.g., 1.0 call "ring" event) to the facilitator. The facilitator generates and sends an invitation message to the client (e.g., 1.1 INVITE) hosted on the client device, and a response (e.g., 1.2 RINGING) is returned to the facilitator from the client. The facilitator sends a call notification to the client (e.g., 1.3 UPDATE) with the rich caller ID and response options, and a response (e.g., 1.4 OK (for UPDATE)) is returned to the facilitator from the client.

In response to a user selection of a response option, the client sends a message (e.g., 1.5 Transfer (in case of re-directing) or Postpone) to the facilitator with information of the user selection. The facilitator sends an acknowledgement message to the client device (e.g., 1.6 ACK (for postpone or transfer response).

When the user response is to re-direct the incoming call to a third-party telephone number, the facilitator instructs the PBX to transfer the call (e.g., 1.7 call transfer (if transfer)). The PBX then transfers the call to a third-party telephone (e.g., 1.8 call transfer).

When the user response is to postpone the incoming call until a later time, the facilitator plays audio prompts to the caller via the PBX (e.g., 1.9 play prompts to caller; hang up (if postponement)). The prompts include verbal notification that the user will call back at a future time, or verbal notification of future time(s) when the caller may attempt to call the user. The facilitator then initiates synchronization of call logs and other state information (e.g., 1.10 initiate SYNC for AC_REQ). The call log would indicate the postponement time, so the client can pop up a reminder at the appropriate time.

A user deciding to ignore an incoming call can do nothing in response to the call request corresponding to the incoming call. If the user does nothing within a pre-specified time period, the call is routed to the enterprise voicemail. The time period for responding to a call request is programmable and can be selected by the user or administrator.

When deciding to blacklist a caller associated with an incoming call, and depending on the user's settings under the AMC system, the incoming call is immediately forwarded to the enterprise voicemail or never answered. Furthermore, future calls from this caller do not ring the user's enterprise desk telephone or result in generation of a call request. The user may view his/her ignore list or blacklist and remove items from the list using either of the client device and/or the user portal of the AMC system.

If the caller terminates the call before the call is accepted or re-directed by the user, the facilitator of an embodiment initiates a return call to the original caller in order to connect the original caller with the AMC user. Under a scenario in which the AMC user decides to delay the call, and the caller terminates the call before the call is delayed by the user, the facilitator calls the original caller and plays a computer-generated audio message indicating a call back time for the caller to consider in reattempting contact with the AMC user. If the callback time is not acceptable to the caller, the facilitator of an embodiment provides the caller with a list of times at which the AMC user should be available to take the call, thereby enabling the caller to choose an acceptable alternative call time; the facilitator also sets the user's postponement reminder to expire at this alternative time.

The facilitator of an embodiment constructs or generates a rich caller ID in response to or upon receipt of a call event, as described above. The rich caller ID includes information, messages, and/or other communications (referred to herein as caller data) that identify the caller to the AMC user and provide additional context to help the user in deciding if and/or when to participate in the call. The rich caller ID is generated by mapping the telephone number of the caller (e.g., received as caller ID with the incoming call) to a contact within the directories of the host enterprise. The directories of the host enterprise used by the facilitator in generating the rich caller ID include internal and/or external directories of the enterprise comprising one or more of corporate directories, directory servers, electronic mail servers, CRM systems (e.g., sales lead telephone numbers), telephone systems, human resource systems, financial systems, personal contacts of the user in personal or enterprise directories, and white pages to name a few. As an example, the caller data includes one or more of a name, address, telephone number, electronic mail address, employer, and job of the caller, but the embodiment is not so limited.

In addition to the information automatically received or gathered from the host enterprise, the facilitator can add additional caller data to the rich caller ID. Examples of additional caller data or information added by the facilitator generally include but are not limited to ice breaker information and sales information, for example. Ice breakers include information available in the user's personal contacts that one might find useful in initiating a conversation. As an example, ice breakers can include personal information of the caller (e.g., family, spouse, relative, children, siblings, birthday, anniversary, etc.). Sales information includes status information about one or more previous interactions with the caller or events involving the caller (e.g., a message indicating a status of work promised to the caller, etc.).

Call screening is an extension of the call notification of an embodiment. The call screening is an extension for which the call notification includes additional information beyond that of the rich caller ID described above. The additional information of an embodiment is supplied by the caller but is not so limited. In one configuration, the additional information is generated by the caller using an input/output device of his/her calling device (e.g., telephone keypad, microphone, touch screen display, etc.) to input a message that is included in the rich caller ID. In another configuration, the caller selects from a menu (e.g., an interactive voice response (IVR) menu) a short subject to best describe the call context. In yet another configuration the caller records a short audio subject that is included in the call notification, and the AMC user can play the audio message before taking an action. In another alternative or additional configuration, and as a component of the call notification, the facilitator streams a voicemail recording to the AMC user, as it is being recorded; the AMC user may take an action pertaining to the call notification based on this streamed audio.

When a user participates in a call using a client device that includes the AMC client, the client automatically answers the transferred call as described above, so the user is not required to "answer" the call twice. However, occasionally, the transferred call may not ring the client device but instead goes directly to the client device voicemail. To ensure the transferred call is answered by client device and not directed to the voicemail of the client device service provider, the facilitator is configured to expect receipt of a DTMF signal or sequence (e.g., "1" tone) from the AMC client when the client auto-answers the call. If the DTMF signal is not sent by the client and/or received by the facilitator within a certain period (e.g., ten (10) seconds) after the call is answered by the client, the facilitator assumes the call went to voicemail of the client device and disconnects the transferred call. Simultaneous with or following disconnection of the transferred call to the client device, the facilitator routes the transferred call to the enterprise voicemail.

Additionally, the AMC client is configured to prevent the client from auto-answering an intervening call that is not the transferred call when the user has selected the option to accept the incoming call. An intervening call as referred to herein is a call that arrives at the client device during a period that begins when a call request is answered by the user (via selection of a response option of the call request) and ends when the transferred call is transferred to the client device. After the user accepts via the call request response options an incoming call, there is a short period before the client device actually rings and the voice channel can be established. Because the AMC client automatically answers the call to enable a better user experience, it is possible for another call to arrive and automatically answered during this intervening period. The AMC client of an embodiment is configured to differentiate between an intervening call and an accepted call by automatically declining the intervening call while waiting for the accepted call.

To ensure the client auto-answers the correct call (transferred call), the client of an embodiment determines if the incoming caller automatic number identification (ANI) matches that of the enterprise PBX expected to extend or transfer calls to the client device. When the client determines a match exists between the PBX expected to transfer the call and the ANI of the incoming call, the client auto-answers the call.

The ANI of the calling PBX may not, however, be constant within a large organization depending on which PBX generated the outgoing call (e.g., depending on dial plan rules and organization PBX deployments). Therefore, in an alternative embodiment, the client automatically answers the first incoming call following acceptance of a call, and expects a DTMF signal or sequence as a handshake signal from the facilitator. The client auto-answers the incoming call upon receipt of an expected DTMF signal. If the client does not receive or detect the expected DTMF signal within a prespecified period, the client terminates the call and auto-answers the next incoming call.

The call notification of an embodiment includes profile-based call requests as described herein. In addition to ignore lists or blacklists, the facilitator can use availability and presence information corresponding to the user to determine whether to generate a call notification request and to ring the user's enterprise desk telephone. For example, if the availability and presence information indicates the user is "not available for voice calls", the call request is not generated but, instead, the call is immediately routed to voicemail. A caller priority list may override this profile-based decision for a select number of callers designated as high-priority callers by the user.

The facilitator of an embodiment includes or couples to an automatic call distributor (ACD) to route calls to numerous and/or different people based on one or more algorithms. This mobile ACD of an embodiment distributes the call notification to one or more AMC users according to a routing algorithm. Therefore, while call notification maps a single telephone line to a single user, mobile ACD dynamically maps a single telephone line to one or more users and routes the call notification to one user for each call. The mobile ACD can include a provision that routes the call sequentially from the "best" user (e.g., based on rule-based routing described below), to the second best user, then to the Nth best user, until a person accepts the call notification. The mobile ACD allows for user responses including accepting, delaying, forwarding, and ignoring call notification requests in determining routing for each call as described above. Additionally, the call may first be answered by an IVR system to enable the caller to enter additional information that can help route the call request(s) accordingly.

As an alternative, the mobile ACD of an embodiment can leverage the ACD functionality of the host enterprise PBX. In so doing, once a call is routed to an enterprise desk telephone of the user, the call notification of an embodiment sends the call request to the user's active client device, thus enabling the user to handle the call in real time while outside the enterprise.

The AMC facilitator includes an adapter or adapter framework by which the facilitator simultaneously integrates with components of the enterprise and enterprise servers, as described above with reference to FIG. 3. The facilitator uses an adapter for each enterprise component to which it integrates. The adapter of an embodiment is a protocol-specific adapter for each enterprise component to which it integrates; alternatively, the adapter includes vendor-specific adapters. As an example, the AMC adapters are used in the generation and routing of call requests as described herein. The AMC adapters can include a set of interfaces and utilities that receive or fetch and convert the data from one or more enterprise components into a common data structure. For example, the AMC adapters can receive information from external systems and use the received information to automatically generate and update configuration of groups and group membership to name a few. This AMC adapter configuration can leverage such external systems as human resource systems, financial systems, customer relationship management (CRM) systems, telephone systems (ACD, etc.), directory servers, and email servers to name a few.

The call request routing described above includes rule-based routing. The rules of rule-based routing are determined, for example, by an enterprise hosting the AMC system, and are controlled by one or more of the AMC facilitator and AMC client. The rule-based routing includes the use of rules that can be customized. The rules of an embodiment can be defined via static configuration or dynamic custom processes. A rule can be based on any number of dynamic data inputs, from any number of disparate systems. Further, a rule can trigger additional processes to run before, after, or during the call request routing.

The call request routing described above can be performed using a variety of routing schemes including, but not limited to, parallel routing, sequential routing, and combined parallel and sequential routing. For example, parallel routing can include simultaneous routing of the request to all selected users. Parallel routing can also include a first routing of the call request to at least one target device of a first set of users simultaneous with a second routing of the call request to at least one target device of a second set of users.

Sequential routing includes sequential routing to each of a selected set of users. For example, the sequential routing includes a first routing of the call request to a first target device of a first user, and a second or subsequent routing of the call request to a second target device of a second user in response to a trigger condition (e.g., elapsed time, the absence of the response message to the first routing, etc.). One or more algorithms of the AMC system select an order of call request routing. As another example, the sequential routing includes a first routing of the call request to at least one target device of a first set of users, and a second routing of the call request to at least one target device of a second set of users in response to a trigger condition (e.g., elapsed time, the absence of the response message to the first routing, etc.).

Combined parallel and sequential routing includes parallel routing to a first set of users, and sequential routing to each of a second set of users. Similarly, the combined parallel and sequential routing includes sequential routing to each of a first set of users, and parallel routing to a second set of users. Additionally, the combined parallel and sequential routing includes parallel routing to a first set of users followed sequentially by parallel routing to a second set of users.

Figure 10:
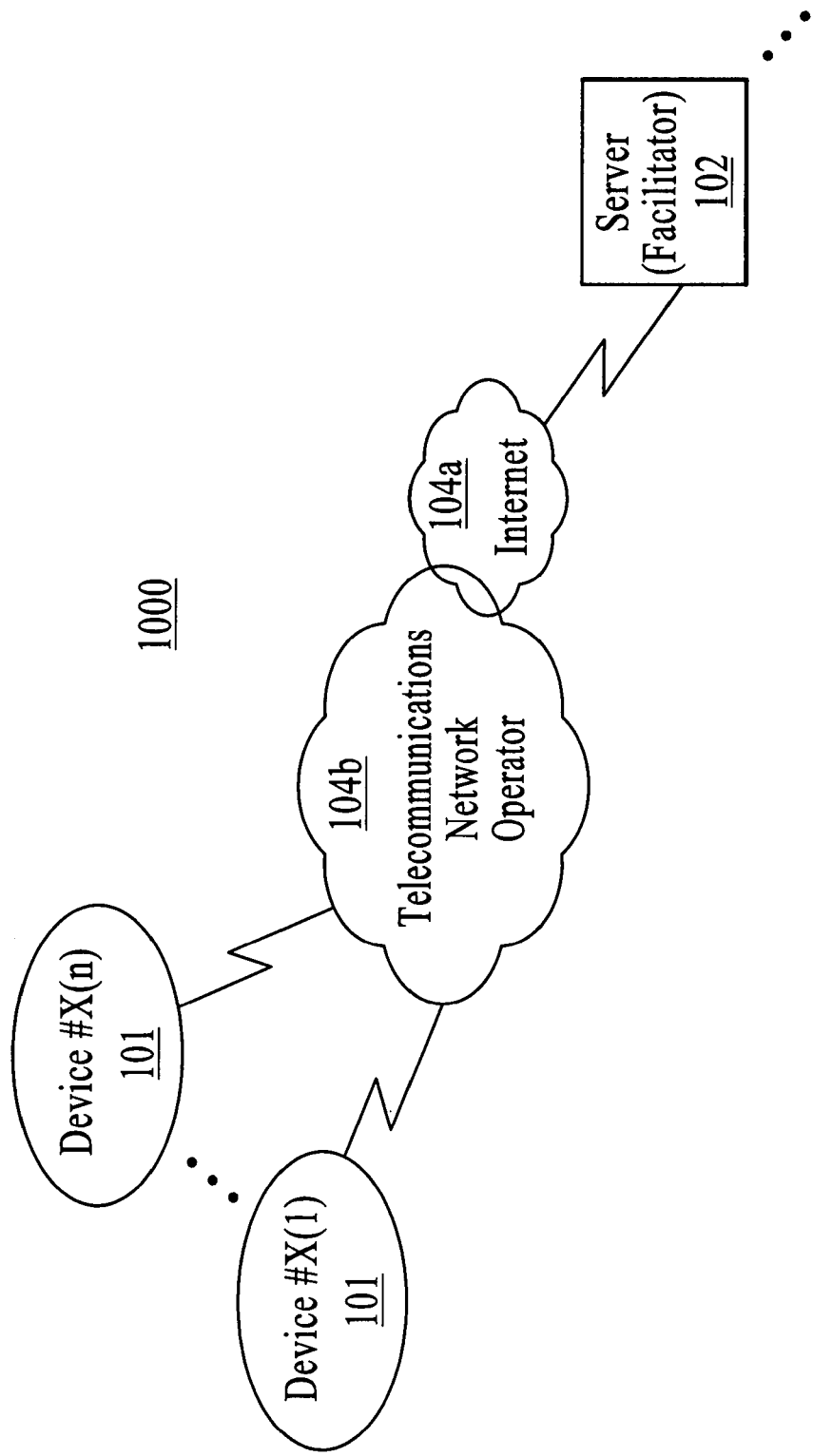
FIG. 10 is a block diagram of an AMC system, under an alternative embodiment.

Some examples follow of alternative AMC system configurations that include the facilitator and client described above. FIG. 10 is a block diagram of an AMC system 1000, under an alternative embodiment. The AMC system 1000 includes a server or other processor-based device hosting the facilitator 102. The facilitator 102 communicates with one or more client devices 101 to provide AMC system functions among the client devices 101 via network couplings that include the Internet 104*a* and a telecommunications network 104*b*. The telecommunications network 104*b* includes, for example, a cellular telephone network or a public switched telephone network (PTSN), but can be other voice and data communication networks as known in the art. The cellular telephone network can use communication protocols that include, for example, Global System for Mobile communication (GSM), General Packet Radio Service (GPRS), Code Division Multiple Access (CDMA), and Time Division Multiple Access (TDMA), but are not so limited.

Figure 11:
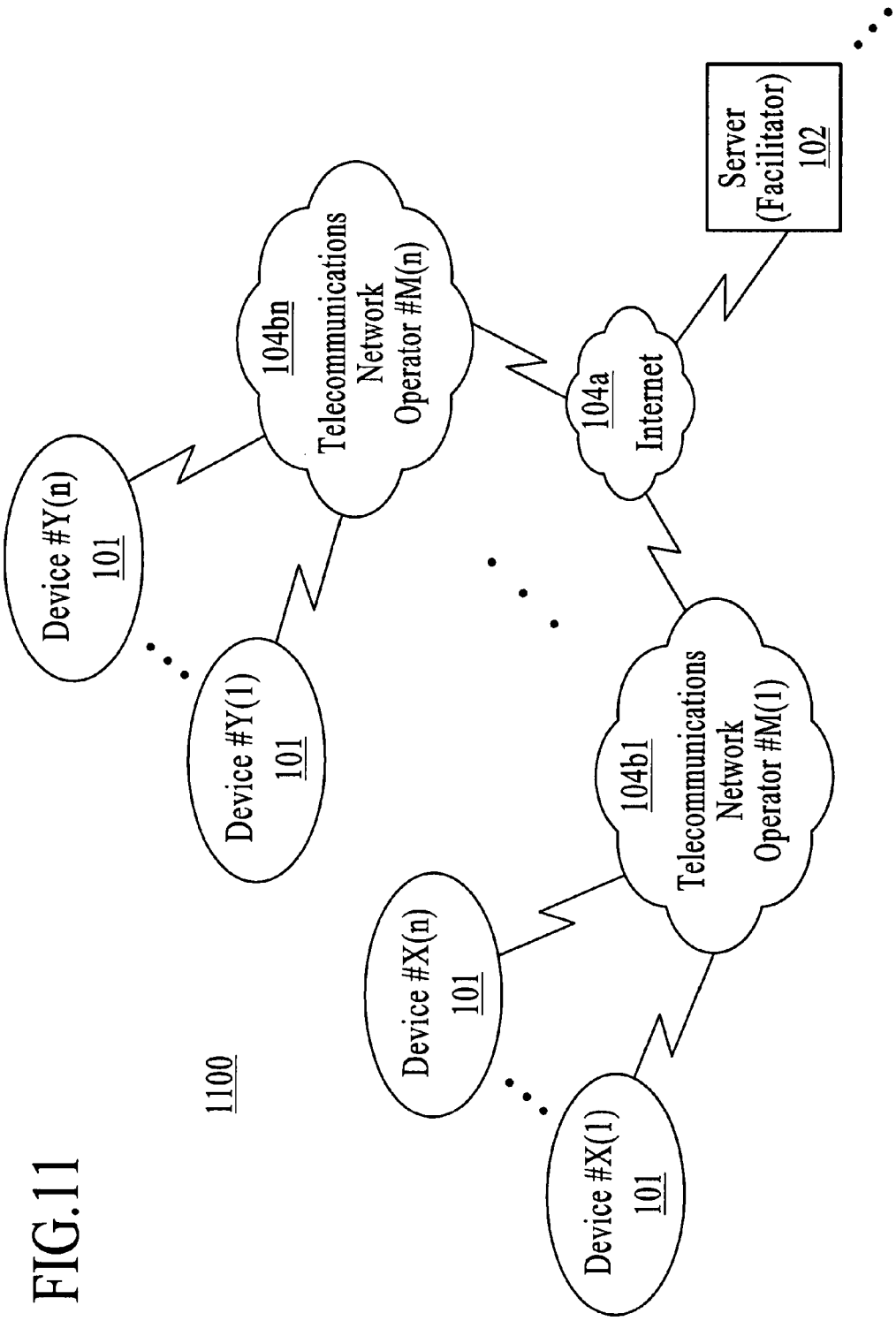
FIG. 11 is a block diagram of an AMC system, under another alternative embodiment.

FIG. 11 is a block diagram of an AMC system 1100, under another alternative embodiment. The AMC system 1100 includes a server hosting the facilitator 102, and the facilitator 102 communicates with one or more client devices 101 to provide AMC system functions among the client devices 101 via network couplings that include the Internet 104*a* and/or multiple telecommunications networks 104*b*1 to 104*bn*. The telecommunications networks 104*b*1-104*bn* are as described above, but are not so limited.

Figure 12:
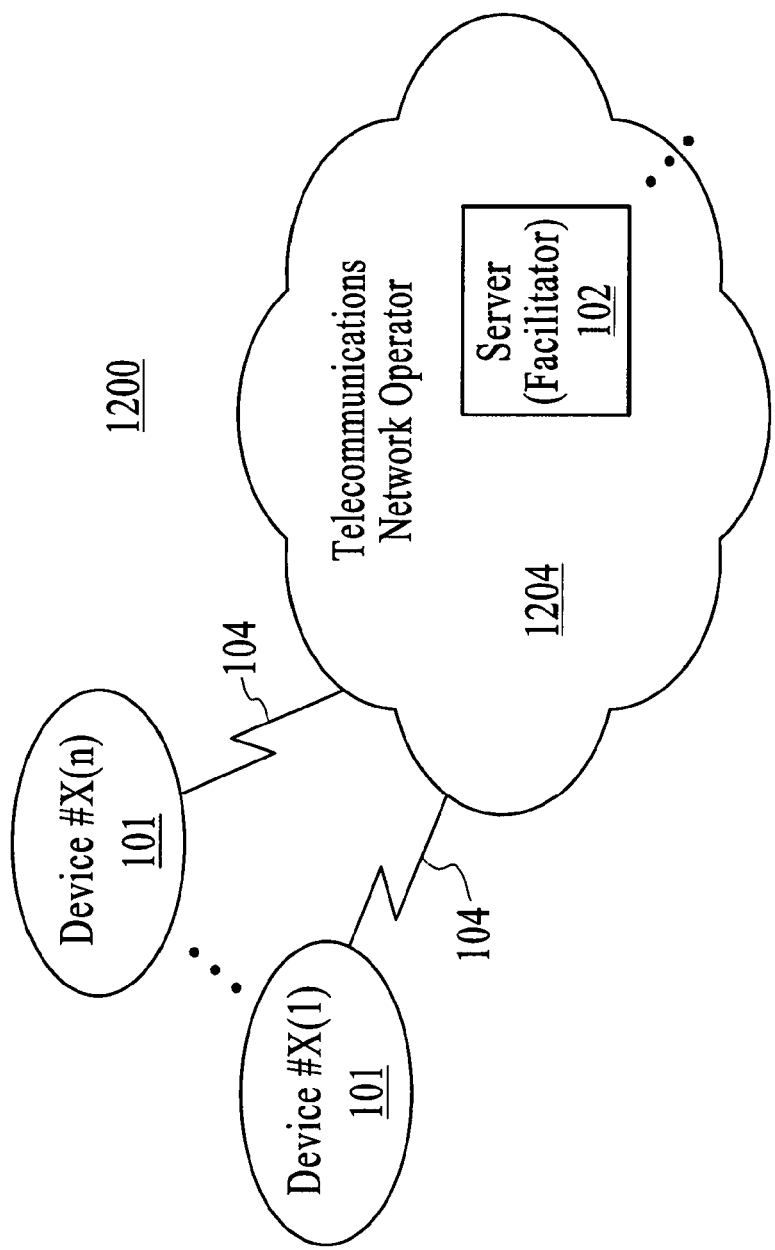
FIG. 12 is a block diagram of an AMC system, under yet another alternative embodiment.

FIG. 12 is a block diagram of an AMC system 1200, under yet another alternative embodiment. The AMC system 1200 includes a server hosting the facilitator 102, and the server/facilitator 102 is a component of a telecommunications network operator infrastructure. The facilitator 102 communicates with one or more client devices 101 to provide AMC system functions among the client devices 101 via network couplings 104, as described above, but is not so limited. In an alternative embodiment, the server/facilitator 102 may not be a component of a telecommunications network operator infrastructure. In another alternative embodiment, the server/facilitator 102 can be a component of one or more other network infrastructures.

Figure 13:
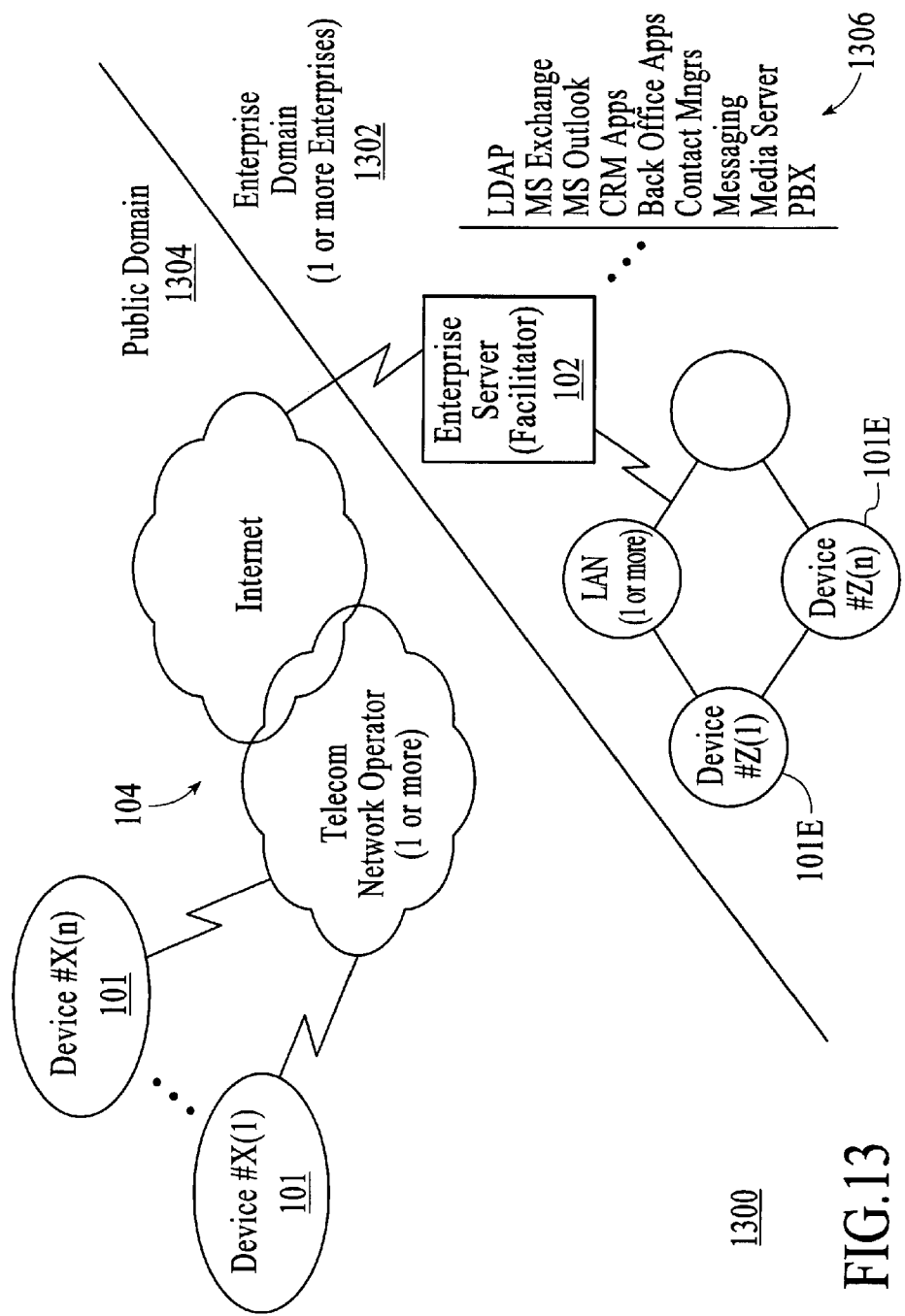
FIG. 13 is a block diagram of an AMC system in an enterprise domain, under another alternative embodiment.

FIG. 13 is a block diagram of an AMC system 1300 in an enterprise domain, under another alternative embodiment. The AMC system 1300 includes a server hosting the facilitator 102 where the server/facilitator 102 is a component of a corporate or enterprise infrastructure 1302. The server can host numerous additional applications 1306 in addition to the facilitator 102 or can be dedicated to the facilitator 102. The facilitator 102 communicates with one or more client devices 101 in the public domain 1304 to provide AMC system functions among the client devices 101 via network couplings 104. The network couplings 104 include, for example, the Internet and one or more telecommunication service provider infrastructures, but can include any number/type of couplings. The facilitator 102 also communicates with one or more client devices 101E in the enterprise domain 1302 to provide AMC system functions among the client devices 101E as described below. The client devices 101E in the enterprise domain 1302 are shown coupled to one or more LANs, but are not so limited.

Figure 14:
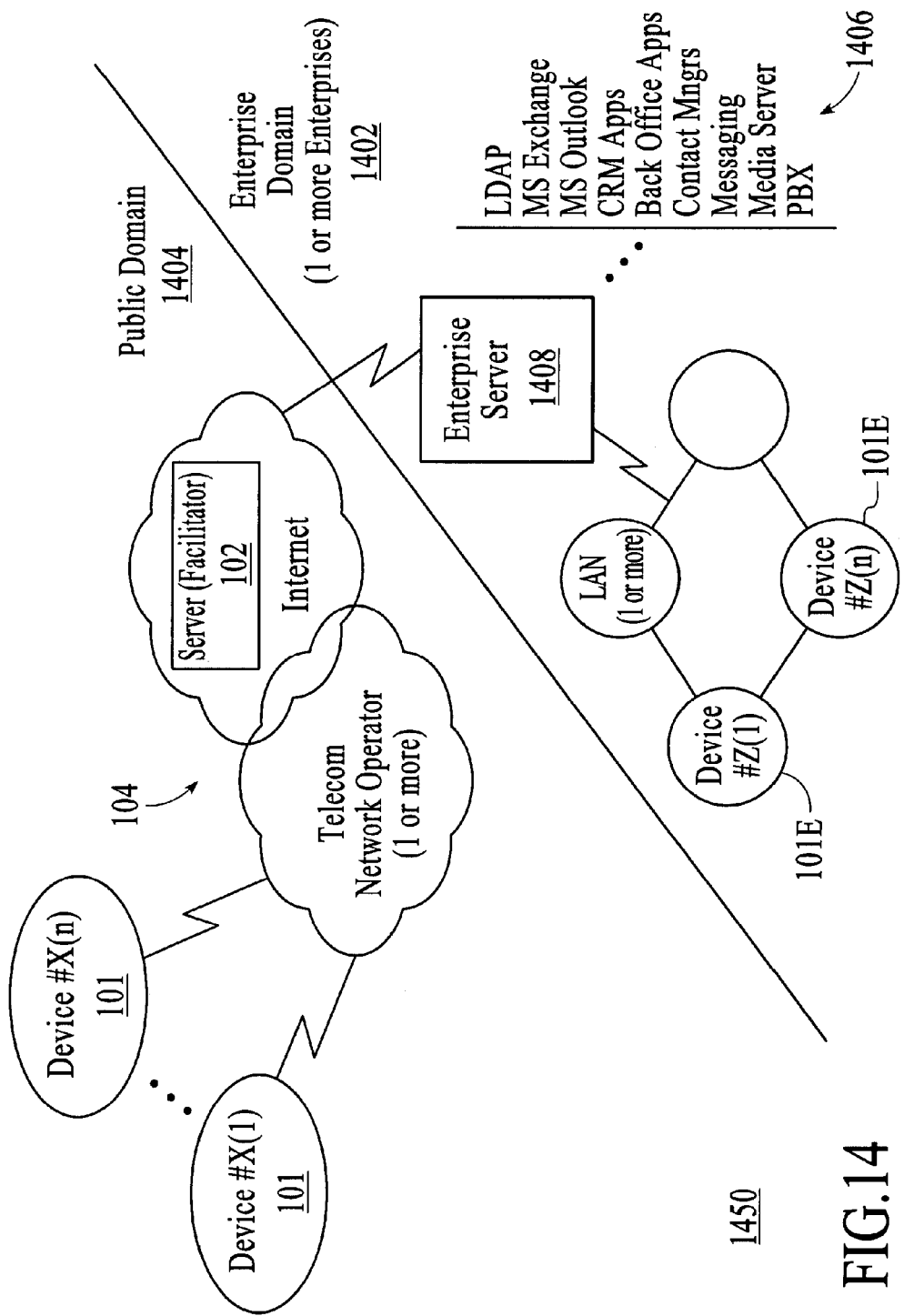
FIG. 14 is a block diagram of an AMC system in a public domain coupled across components of an enterprise domain, under another alternative embodiment.

FIG. 14 is a block diagram of an AMC system 1450 in a public domain coupled across components of an enterprise domain, under another alternative embodiment. The AMC system 1450 includes a server hosting the facilitator 102 where the server/facilitator 102 is a component of a carrier or service provider infrastructure or hosted data center infrastructure for example, but is not so limited. The facilitator 102 communicates with one or more client devices 101 in the public domain 1404 to provide AMC system functions among the client devices 101 via network couplings 104. The network couplings 104 include, for example, the Internet and one or more telecommunication service provider infrastructures, but can include any number/type of couplings. The facilitator 102 also communicates with components of the enterprise domain 1402 including, for example, one or more client devices 101E, one or more enterprise servers 1408, and one or more LANs. The facilitator 102 provides AMC system functions among the client devices 101E as described below. The client devices 101E in the enterprise domain 1402 are shown coupled to one or more LANs, but are not so limited.

As an alternative to the couplings of this AMC system 1400, the facilitator can be hosted on one or more servers (not shown) of the telecommunications network operator. The facilitator of the telecommunications network operator couples to the enterprise servers via local contact servers (not shown) and/or Virtual Private Network (VPN) couplings, but is not so limited.

Figure 15:
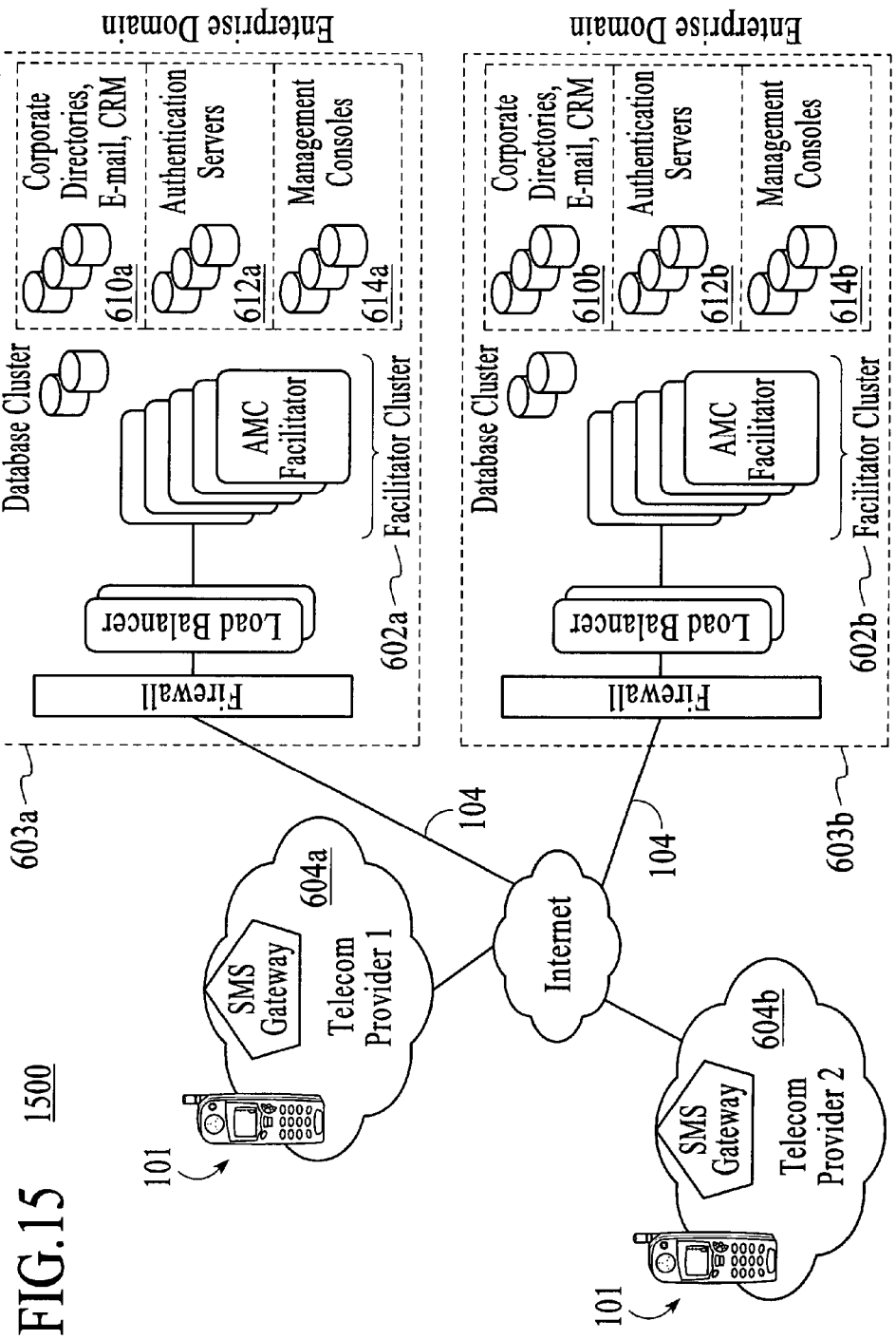
FIG. 15 is a block diagram of an AMC system in an enterprise domain, under still another alternative embodiment.

FIG. 15 is a block diagram of an AMC system 1500 in an enterprise domain, under still another alternative embodiment. The AMC system 1500 includes one or more facilitators that form facilitator clusters 602a and 602b within each of a number of enterprise domains 603a and 603b. Facilitators of the facilitator clusters 602a and 602b communicate with one or more client devices 101 to provide AMC system functions among the client devices 101 via network couplings 104. The network couplings 104 include, for example, at least one of the Internet and multiple telecommunication service providers 604a and 604b, but can include any number/type of couplings. The facilitators also couple with at least one of corporate directory servers and/or electronic mail (email) servers 610a/610b, authentication servers 612a/612b, and management consoles 614a/614b of the enterprise domains 603a/603b, but are not so limited.

Figure 16:
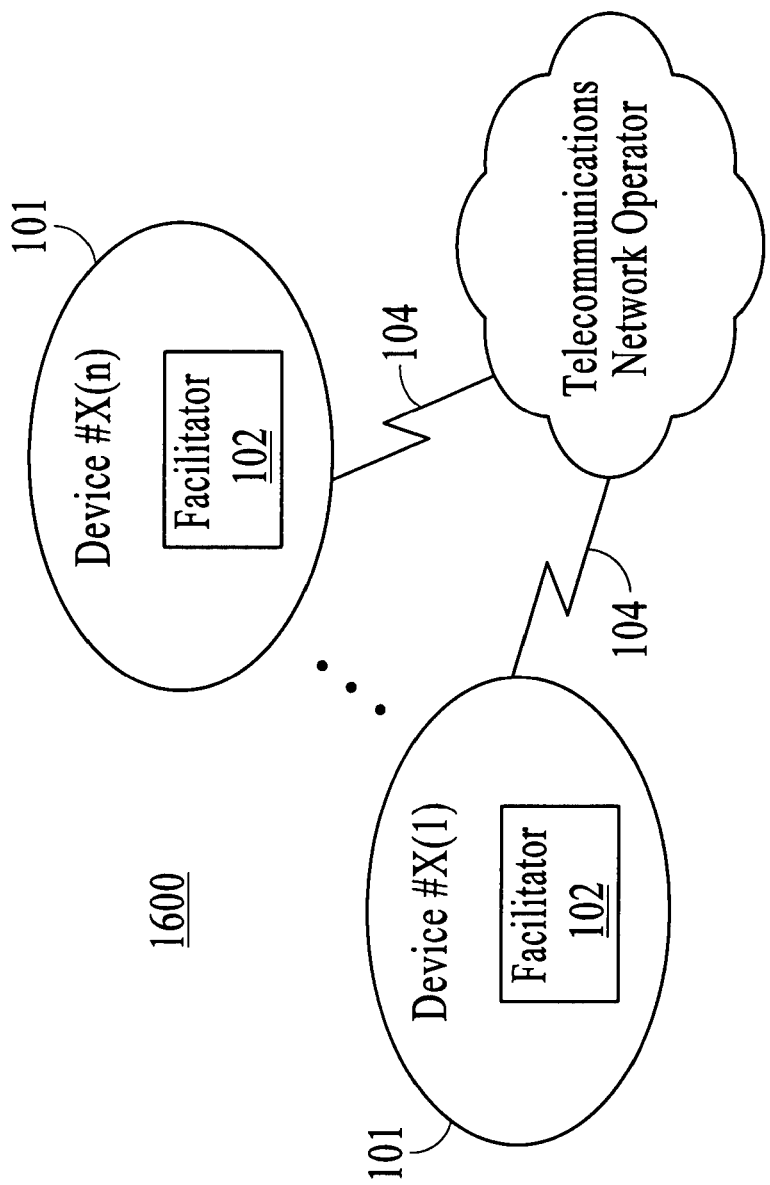
FIG. 16 is a block diagram of an active mobile collaboration (AMC) system, under an embodiment.

FIG. 16 is a block diagram of an active mobile collaboration (AMC) system 1600, under an embodiment. The AMC system 1600 includes any number X(n) of communication devices 101 coupled for communication via one or more facilitators 102 and one or more couplings 104. One or more of the communication devices 101 include an AMC client application. Additionally, one or more of the communication devices 101 include the facilitator 102. The AMC client applications and facilitator applications function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones, as described in detail below.

The AMC system components including the facilitator and AMC client described above function to allow users of the client devices or handsets like cellular telephones to quickly coordinate conversations, screen unwanted calls and interruptions and access enterprise directories. Specifically, the AMC system components increase call success rates by dynamically managing how and when mobile calls take place, let users intelligently screen calls based on caller identity, urgency and subject matter, quickly show which contacts are available to talk and which contacts choose not to be disturbed, reduce interruptions while encouraging urgently needed call-backs, and increase accessibility of enterprise and personal contact information from mobile phones.

The communication systems of an embodiment include a method comprising receiving call event data in response to a call received from a caller via a voice channel. The method of an embodiment includes generating a call request including caller data and a plurality of call responses. The caller data of an embodiment includes caller data of databases of an enterprise. The plurality of call responses of an embodiment includes options for participating in the call. The method of an embodiment includes routing the call request via a data channel to a target device designated by a user.

The routing of an embodiment includes routing the call request via the data channel to the target device. The method of an embodiment includes presenting the plurality of call responses at the target device.

The method of an embodiment includes transferring the call to a telephone of the enterprise, wherein the telephone is assigned to the user.

The plurality of call responses of an embodiment includes accepting the call. The method of an embodiment includes transferring the call to the target device via a target device voice channel. The method of an embodiment includes automatically answering the call at the target device.

The method of an embodiment includes decoupling the call transferred to the target device absent a response message received from the target device answering the call. The method of an embodiment includes retransferring the call to a voicemail box of the user.

The automatically answering of an embodiment includes answering in response to authenticating the enterprise performing the transferring.

The method of an embodiment includes decoupling the call transferred to the target device absent a response message received from the target device answering the call. The method of an embodiment includes automatically answering a next incoming call to the target device.

The method of an embodiment includes detecting termination of the call prior to the accepting. The method of an embodiment includes initiating a return call to the caller via the voice channel.

The method of an embodiment includes transferring the return call to a target device of the user via a target device voice channel.

The plurality of call responses of an embodiment includes postponing the call. The method of an embodiment includes notifying the caller that the user to whom the call is directed is unavailable to accept the call. The method of an embodiment includes directing the call to a voicemail box of the user. The notifying of an embodiment includes specifying a future time at which the user will be available to accept the call.

The method of an embodiment includes generating a reminder message of the call in response to the postponing, wherein the reminder message includes the future time. The method of an embodiment includes transferring the reminder message to a target device of the user.

The method of an embodiment includes receiving a selection of the future time from one or more of the caller and the user. The method of an embodiment includes prompting one or more of the caller and the user for the future time.

The method of an embodiment includes detecting termination of the call prior to the postponing. The method of an embodiment includes initiating a return call to the caller via the voice channel. The method of an embodiment includes playing a message during the return call, the message specifying a future time at which the user will be available to accept the call. The method of an embodiment includes receiving a selection of an alternative future time from the caller during the return call.

The method of an embodiment includes generating a reminder message of the call in response to the postponing, wherein the reminder message includes one or more of the future time and the alternative future time. The method of an embodiment includes transferring the reminder message to a target device of the user.

The plurality of call responses of an embodiment includes forwarding the call.

The forwarding of an embodiment comprises dynamically forwarding the call to a forwarding telephone number of the user via the voice channel.

The method of an embodiment includes receiving the forwarding telephone number from the user.

The receiving of an embodiment includes transferring to a target device of the user a set of telephone numbers including the forwarding telephone number. The receiving of an embodiment includes receiving data of a selection from the target device, wherein the data of the selection includes the forwarding telephone number.

The receiving of an embodiment includes prompting the user at a target device for the forwarding telephone number. The receiving of an embodiment includes receiving data of a user input from the target device, wherein the data of the user input includes the forwarding telephone number.

The method of an embodiment includes detecting termination of the call prior to the forwarding. The method of an embodiment includes initiating a return call to the caller via the voice channel. The method of an embodiment includes transferring the return call to a target device of the user via a target device voice channel and the forwarding telephone number.

The plurality of call responses of an embodiment includes ignoring the call.

The method of an embodiment includes directing the call to a voicemail box of the user.

The plurality of call responses of an embodiment includes designating the caller as an ignored caller.

The method of an embodiment includes directing the call to a voicemail box of the user. The method of an embodiment includes ignoring the call. The method of an embodiment includes ignoring a future call from the ignored caller. Caller data of an embodiment includes one or more of a name, address, telephone number, electronic mail address, employer, and job of the caller.

Caller data of an embodiment includes personal data of the caller, the personal data comprising data of one or more of a spouse, relative, child, anniversary, and birthday of the caller.

Caller data of an embodiment includes one or more of data of at least one interaction between the caller and the user.

Caller data of an embodiment includes screening data received from the caller. The screening data of an embodiment includes one or more of data input by the caller and pre-specified data selected by the caller. The screening data of an embodiment includes audio data recorded by the caller. The screening data of an embodiment includes a voicemail message.

The method of an embodiment includes streaming the voicemail message to the user.

The routing of an embodiment includes distributed routing of the call request to at least one other target device of at least one other user. The distributed routing of an embodiment includes one or more of routing to the at least one other user instead of the routing to the user and routing to the at least one other user in addition to the routing to the user.

The distributed routing of an embodiment includes parallel routing to a plurality of other users.

The distributed routing of an embodiment includes a first routing of the call request to at least one target device of a first set of other users. The distributed routing of an embodiment includes a second routing of the call request to at least one target device of a second set of other users.

The distributed routing of an embodiment includes sequential routing to each of a plurality of other users.

The method of an embodiment includes determining a hierarchy of the routing, wherein the hierarchy defines an order of the routing to the plurality of other users.

The distributed routing of an embodiment includes parallel routing to a first plurality of other users. The distributed routing of an embodiment includes sequential routing to each of a second plurality of other users.

The distributed routing of an embodiment includes routing according to availability of the resource, wherein the availability includes one or more of presence of the resource, reachable status of the resource, availability determined by a host system, and availability specified by the resource.

The plurality of call responses of an embodiment includes generating a return data message to the caller including at least one of a text message and a voice message.

Routing the call request of an embodiment includes routing in accordance with context information. The context information of an embodiment includes at least one of a connectivity state and an availability profile of a target device of the user. The connectivity state of an embodiment includes information of a state of connectivity of the target device to a communication network. The connectivity state of an embodiment includes at least one of a reachable state and an unreachable state. The target device of an embodiment is in a reachable state when the target device is in a powered state and connected to a corresponding communication network. The target device of an embodiment is in an unreachable state when the target device is one or more of in an un-powered state, disconnected from the communication network, and engaged in a voice call.

The method of an embodiment includes transferring context information of the user to the caller, wherein the context information includes at least one of presence information and a current availability state of a target device of the user.

The call request of an embodiment includes a data message that includes one or more of a text message and a voice message.

The target device of an embodiment includes one or more of a cellular telephone, mobile device, wireless device, wireline device, voice over Internet Protocol (VOIP) device, private branch exchange device, soft client, and desktop client.

One or more of the voice channel and the data channel of an embodiment is hosted by one or more of the enterprise, a service provider, and a mobile network operator.

The method of an embodiment includes transferring media to the target device of the user via one or more of the voice channel and the data channel.

The communication systems of an embodiment include a method comprising receiving a call for a user via a voice channel. The method of an embodiment includes generating a call request in response to call event data of the call. The call request of an embodiment includes identification data of a caller received from a directory of the enterprise, wherein the caller originated the call. The method of an embodiment includes routing the call request to a target device of the user via a data channel. The method of an embodiment includes generating a plurality of call responses at the target device. The plurality of call responses of an embodiment includes options for participating in the call.

The communication systems of an embodiment include a system comprising a server coupled to an enterprise and at least one communication network. The server of an embodiment includes a facilitator configured to receive call event data in response to a call received from a caller via a voice channel, and to generate a call request including caller data and a plurality of call responses. The caller data of an embodiment includes caller data of databases of the enterprise. The plurality of call responses of an embodiment includes options for participating in the call. The system of an embodiment includes a communication device including a client. The facilitator of an embodiment is configured to route the call request to the client via a data channel.

The client of an embodiment is configured to present the plurality of call responses at the communication device.

The system of an embodiment includes transferring the call to a telephone of the enterprise.

The plurality of call responses of an embodiment includes accepting the call.

The facilitator of an embodiment is configured to transfer the call to the communication device via a communication network.

The client of an embodiment is configured to automatically answer the call.

The facilitator of an embodiment is configured to decouple the call transferred absent a response message received from the client. The facilitator of an embodiment is configured to retransfer the call to a voicemail box of the user.

The client of an embodiment is configured to authenticate the enterprise performing the transferring before automatically answering the call.

The facilitator of an embodiment is configured to decouple the call transferred to the target device absent a response message received from the client. The facilitator of an embodiment is configured to automatically answer a next incoming call to the communication device.

The plurality of call responses of an embodiment includes postponing the call.

The facilitator of an embodiment is configured to notify the caller that a user to whom the call is directed is unavailable to accept the call.

The facilitator of an embodiment is configured to direct the call to a voicemail box of the user.

Configured to notify of an embodiment includes configured to specify a future time at which the user will be available to accept the call.

The facilitator of an embodiment is configured to generate a reminder message of the call in response to the postponing, wherein the reminder message includes the future time. The facilitator of an embodiment is configured to transfer the reminder message to the client.

The facilitator of an embodiment is configured to detect termination of the call prior to the postponing. The facilitator of an embodiment is configured to initiate a return call to the caller via the voice channel.

The plurality of call responses of an embodiment includes forwarding the call.

The facilitator of an embodiment is configured to dynamically forward the call to at least one forwarding telephone number of the user via the voice channel.

The facilitator of an embodiment is configured to detect termination of the call prior to the forwarding. The facilitator of an embodiment is configured to initiate a return call to the caller via the voice channel.

The plurality of call responses of an embodiment includes ignoring the call.

The facilitator of an embodiment is configured to route the call to a voicemail box of the enterprise.

The plurality of call responses of an embodiment includes designating the caller as an ignored caller.

The system of an embodiment includes ignoring a future call from the ignored caller.

The caller data of an embodiment includes one or more of a name, address, telephone number, electronic mail address, employer, and job of the caller. Caller data of an embodiment includes personal data of the caller. The personal data of an embodiment comprises data of one or more of a spouse, relative, child, anniversary, and birthday of the caller. Caller data of an embodiment includes one or more of data of at least one interaction between the caller and the user.

The caller data of an embodiment includes screening data received from the caller. Screening data of an embodiment includes one or more of data input by the caller, pre-specified data selected by the caller, audio data recorded by the caller, and a voicemail message.

The routing of an embodiment includes distributed routing of the call request to at least one other client of at least one other communication device. The facilitator of an embodiment is configured to perform distributed routing that includes one or more of routing to the at least one other client instead of the routing to the client and routing to the at least one other client in addition to the routing to the client.

The communication systems of an embodiment include a computer readable media including executable instructions which, when executed in a processing system, provides call notification by receiving call event data in response to a call received from a caller via a voice channel. The executable instructions of an embodiment, when executed, generate a call request including caller data and a plurality of call responses. The caller data includes caller data of databases of an enterprise. The plurality of call responses of an embodiment includes options for participating in the call. The executable instructions of an embodiment, when executed, route the call request to a user via a data channel.

Aspects of the communications systems described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the communications systems include: microcontrollers with memory (such as electronically erasable programmable read-only memory (EEPROM)), embedded microprocessors, firmware, software, etc. Furthermore, aspects of the communications systems may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the communications systems is not intended to be exhaustive or to limit the systems and methods described to the precise form disclosed. While specific embodiments of, and examples for, the communications systems are described herein for illustrative purposes, various equivalent modifications are possible within the scope of other communications systems and methods, as those skilled in the relevant art will recognize. The teachings of the communications systems provided herein can be applied to other processing systems and methods, not only for the systems and methods described above.

The elements and acts of the various embodiments described above can be combined to provide further embodiments. These and other changes can be made to the communications systems in light of the above detailed description.

In general, in the following claims, the terms used should not be construed to limit the communications systems to the specific embodiments disclosed in the specification and the claims, but should be construed to include all systems that operate under the claims. Accordingly, the communications systems are not limited by the disclosure, but instead the scope of the communications systems is to be determined entirely by the claims.

While certain aspects of the communications systems are presented below in certain claim forms, the inventors contemplate the various aspects of the communications systems in any number of claim forms. Accordingly, the inventors reserve the right to add additional claims after filing the application to pursue such additional claim forms for other aspects of the communications systems.

The invention claimed is:

1. A system comprising:
 a server coupled with an enterprise and at least one communication network, the server including a facilitator, wherein the facilitator is operable to:
 receive from an associated caller a call via a first voice channel to a telephone of an associated user;
 generate a call request in response to call event data of the call, wherein the call request includes caller identification data received from a directory stored in a memory, the caller identification data relating to information of the associated caller;
 route the call request to a target device via a data channel without transferring the received call via a second voice channel to the target device, while concurrently directing the call via the first voice channel to the telephone;
 generate a plurality of call response options relative to the call at the target device; and
 cancel the call request by sending a notification to the target device via the data channel responsive to determining the call was answered at the telephone before a selected call response was received from the target device via the data channel.

2. The system of claim 1, wherein the facilitator is further operable to retransfer the call to a voicemail box of the telephone responsive to an absence of a response message from the target device confirming within a predetermined time that the target device answered the call and after transferring the call to the target device.

3. The system of claim 1, wherein the facilitator is further operable to automatically answer the call at the target device.

4. The system of claim 1, wherein the plurality of call response options include postponing the call.

5. The system of claim 1, wherein the facilitator is further operable to route the call request to at least one other target device of at least one second associated user, wherein the distributed routing includes one or more of routing to the at least one second associated user instead of the routing to a first user and routing to the at least one second associated user in addition to the routing to the first user.

6. The system of claim 1, wherein the facilitator is further operable to:
detect termination of the call prior to the accepting; and
initiate a return call to the associated caller.

7. A system comprising:
a server coupled with an enterprise and at least one communication network, the server including a facilitator, wherein the facilitator is operable to:
receive from an associated caller a call via a first voice channel to a telephone of an associated user;
generate a call request in response to call event data of the call, wherein the call request includes caller identification data received from a directory stored in a memory, the caller identification data relating to information of the associated caller;
route the call request to a target device via a data channel without transferring the received call via a second voice channel to the target device, while concurrently directing the call via the first voice channel to the telephone;
generate a plurality of call response options relative to the call at the target device; and
selectively decouple the call transferred to the designated target device and retransferring the call to a voicemail box of the telephone responsive to an absence of a response message from the designated target device confirming within a predetermined time that the designated target device answered the call and after transferring the call to the designated target device.

8. A method comprising:
receiving, at a server facilitator, call event data for calls to a telephone of an associated user received via a first voice channel;
generating, via the server facilitator, call requests including caller data and a plurality of call responses, wherein the plurality of call response options include accepting the call;
routing call requests, via the server facilitator, to a target device via a data channel without transferring the received call via a second voice channel to the target device, while concurrently directing the call via the first voice channel to the telephone;
selectively transferring calls, via the server facilitator, to the target device via the second voice channel responsive to receiving the accepting the call response from the target device before determining the call was answered at the telephone;
canceling call requests, via the server facilitator, by sending a notification to the target device via the data channel responsive to determining the received call was answered via the first voice channel at the telephone before a selected call response was received via the data channel; and,
selectively decoupling calls, via the server facilitator, that transferred to the target device and retransfer the call to a voicemail box of the telephone responsive to an absence of a response message from the target device confirming within a predetermined time that the target device answered the call and after the transferring call to the target device.

9. The method of claim 8, further comprising directing the call to a voicemail box of the user.

10. The method of claim 8, wherein notifying the caller further comprises specifying a future time at which the user will be available to accept the call.

11. The method of claim 8, wherein the plurality of call responses include postponing the call.

12. The method of claim 11, further comprising:
generating a reminder message of the call in response to the postponing, wherein the reminder message includes the future time; and
transferring the reminder message to the target device.

13. The method of claim 11, further comprising:
detecting termination of the call prior to the postponing; and
initiating a return call to the caller via the voice channel.

14. A non-transitory computer readable medium including executable instructions which, when executed in a processing system, provides call notification by:
receiving, at a server facilitator, call event data for calls to a telephone of an associated user received via a first voice channel;
generating, via the server facilitator, call requests including caller data and a plurality of call responses, wherein the plurality of call response options include accepting the call;
routing call requests, via the server facilitator, to a target device via a data channel without transferring the received call via a second voice channel to the target device, while concurrently directing the call via the first voice channel to the telephone;
selectively transferring calls, via the server facilitator, to the target device via the second voice channel responsive to receiving the accepting the call response from the target device before determining the call was answered at the telephone;
canceling call requests, via the server facilitator, by sending a notification to the target device via the data channel responsive to determining the received call was answered via the first voice channel at the telephone before a selected call response was received via the data channel; and,
selectively decoupling calls, via the server facilitator, that transferred to the target device and retransfer the call to a voicemail box of the telephone responsive to an absence of a response message from the target device confirming within a predetermined time that the target device answered the call and after the transferring call to the target device.

15. The computer readable medium of claim 14, further comprising directing the call to a voicemail box of the user.

16. The computer readable medium of claim 14, further comprising directing the call to a voicemail box of the user.

17. The computer readable medium of claim 14, wherein the plurality of call responses include postponing the call.

18. The computer readable medium of claim 17, further comprising:
generating a reminder message of the call in response to the postponing, wherein the reminder message includes the future time; and
transferring the reminder message to the target device.

19. The computer readable medium of claim 17, further comprising:
detecting termination of the call prior to the postponing; and
initiating a return call to the caller.

* * * * *